US008857713B2

(12) United States Patent
Lieberman et al.

(10) Patent No.: US 8,857,713 B2
(45) Date of Patent: *Oct. 14, 2014

(54) SYSTEMS METHODS AND COMPUTER PROGRAM PRODUCTS FOR ENCODING AND DECODING TRANSACTION DATA

(71) Applicant: Intuit Inc., Mountain View, CA (US)

(72) Inventors: Jonathan A. Lieberman, San Diego, CA (US); Ryan M. Steckler, San Diego, CA (US); Bennett R. Blank, San Diego, CA (US); Ronald J. Char, San Diego, CA (US); Justin C. Marr, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,289

(22) Filed: Apr. 15, 2013

(65) Prior Publication Data

US 2014/0027509 A1  Jan. 30, 2014

Related U.S. Application Data

(63) Continuation of application No. 13/031,023, filed on Feb. 18, 2011, now Pat. No. 8,418,920.

(51) Int. Cl.
*G06K 15/00* (2006.01)
*G06Q 90/00* (2006.01)
*G06Q 40/00* (2012.01)
*G06Q 10/10* (2012.01)
*G06K 19/06* (2006.01)

(52) U.S. Cl.
CPC .......... *G06K 19/06037* (2013.01); *G06Q 90/00* (2013.01); *G06Q 40/123* (2013.01); *G06Q 10/10* (2013.01)
USPC ........................................... 235/383; 235/380

(58) Field of Classification Search
USPC .................. 235/383, 380, 385, 462.09, 462.1
See application file for complete search history.

(56) References Cited

U.S. PATENT DOCUMENTS 5,490,217 A   2/1996  Wang et al.
6,189,781 B1 *  2/2001  Yoshinaga et al. ............ 235/375
(Continued)

FOREIGN PATENT DOCUMENTS

JP   2006260521 A   9/2006
JP   2006268302 A   10/2006
(Continued)

OTHER PUBLICATIONS

PCT International Search Report for PCT/US2011/026330, Applicant: Intuit Inc., Form PCT/ISA/210 and 220, dated Feb. 8, 2012 (5 pages).
(Continued)

*Primary Examiner* — Daniel St Cyr
(74) *Attorney, Agent, or Firm* — Vista IP Law Group LLP

(57) ABSTRACT

Transaction or receipt data, e.g., data of a receipt document, is encoded as a two-dimensional machine readable representation, such as a QR CODE. Certain receipt data is encoded as segments of a QR CODE. An image of the QR CODE is acquired using a camera of a mobile communication device or computer or other image capture device. The QR CODE image is decoded to determine the receipt data, and fields of an electronic receipt summary can be populated with decoded data.

24 Claims, 37 Drawing Sheets

(56) References Cited

U.S. PATENT DOCUMENTS

| | | | |
|---|---|---|---|
| 6,202,052 B1 | 3/2001 | Miller | |
| 6,460,763 B1 * | 10/2002 | Yoshinaga et al. | 235/375 |
| 6,490,601 B1 | 12/2002 | Markus et al. | |
| 6,996,546 B1 | 2/2006 | Giles et al. | |
| 7,428,988 B1 * | 9/2008 | Starr | 235/383 |
| 7,600,673 B2 * | 10/2009 | Stoutenburg et al. | 235/380 |
| 7,778,895 B1 | 8/2010 | Baxter et al. | |
| 7,974,899 B1 | 7/2011 | Prasad et al. | |
| 8,418,920 B2 * | 4/2013 | Lieberman et al. | 235/383 |
| 2008/0109355 A1 | 5/2008 | Dutta et al. | |

FOREIGN PATENT DOCUMENTS

| | | | |
|---|---|---|---|
| JP | 2007011560 A | 1/2007 |
| JP | 2007034916 A | 2/2007 |
| JP | 2007328549 A | 12/2007 |
| JP | 2008077245 A | 4/2008 |
| JP | 2010009158 A | 1/2010 |
| JP | 2010128964 A | 6/2010 |
| KR | 1020070005407 A | 1/2007 |

OTHER PUBLICATIONS

PCT Written Opinion of the International Search Authority for PCT/US2011/026330, Applicant: Intuit Inc., Form PCT/ISA/237, dated Feb. 8, 2012 (5 pages).

PCT International Search Report for PCT/2011/026340, Applicant: Intuit Inc., Form PCT/ISA/210 and 220, dated Feb. 28, 2012 (5 pages).

PCT Written Opinion of the International Search Authority for PCT/US2011/026340, Applicant: Intuit Inc., Form PCT/ISA/237, dated Feb. 28, 2012 (9 pages).

Final Office Action dated Aug. 14, 2012 in U.S. Appl. No. 13/031,023, filed Feb. 18, 2011, (6 pages).

Amendment dated Nov. 14, 2012 in U.S. Appl. No. 13/031,023, filed Feb. 18, 2012, (12 pages).

Notice of Allowance dated Dec. 10, 2012 in U.S. Appl. No. 13/031,023, filed Feb. 18, 2012, (7 pages).

Amendment After Notice of Allowance dated Mar. 11, 2013 in U.S. Appl. No. 13/031,023, filed Feb. 18, 2012, (12 pages).

Office Action dated Aug. 1, 2012 in U.S. Appl. No. 13/030,983, filed Feb. 11, 2011, (15 pages).

Interview Summary dated Nov. 6, 2012 in U.S. Appl. No. 13/030,983, filed Feb. 11, 2011, (3 pages).

Amendment dated Nov. 14, 2012 in U.S. Appl. No. 13/030,983, filed Feb. 11, 2011, (16 pages).

Final Office Action dated Feb. 27, 2013 in U.S. Appl. No. 13/030,983, filed Feb. 11, 2011, (20 pages).

Amendment filed May 24, 2013 in U.S. Appl. No. 13/030,983, filed Feb. 18, 2011, (18 pages).

* cited by examiner

| Tax Data (Category/Type) | Segment |
|---|---|
| Data 1 | Segment 1 |
| Data 2 | Segment 2 |
| Data 3 | Segment 3 |
| Data 4 | Segment 4 |
| Data 5 | Segment 5 |

602a — Tax Data (Category/Type) column
602b — Segment column

FIG. 6A

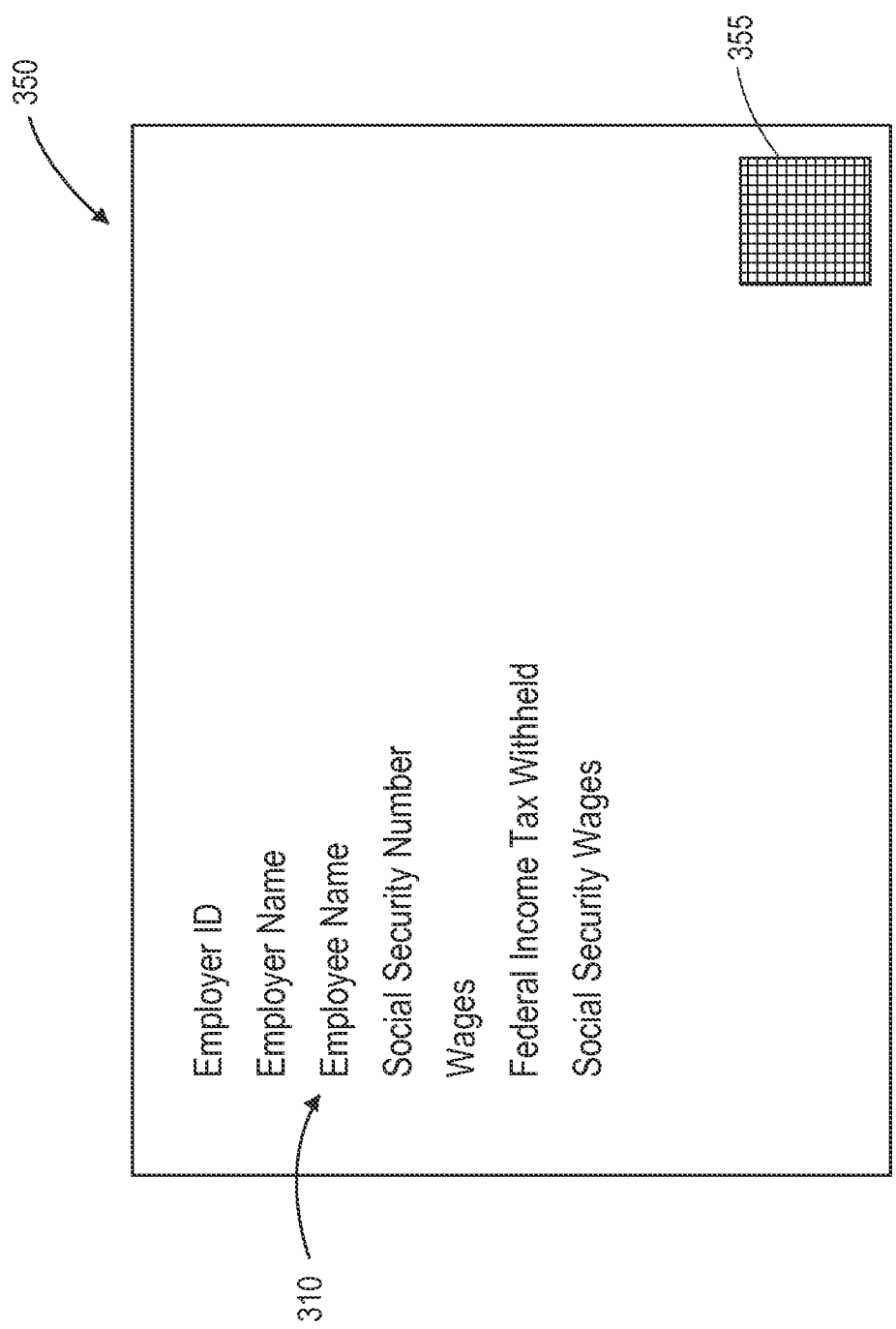

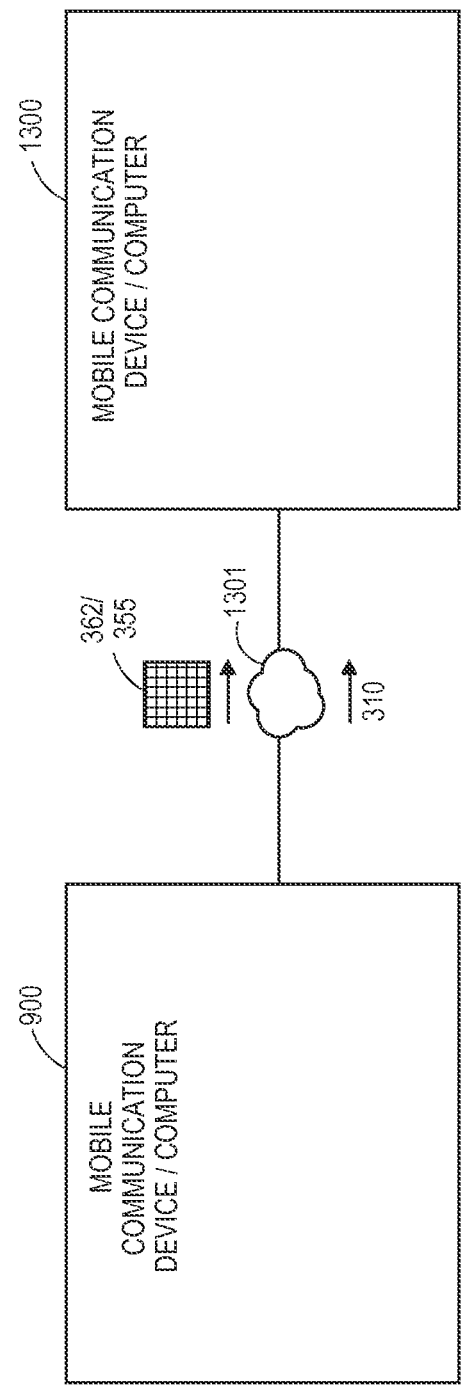

1700

1702a   1702b

| Transaction Data (Category/Type) | Segment |
|---|---|
| Data 1 | Segment 1 |
| Data 2 | Segment 2 |
| Data 3 | Segment 3 |
| Data 4 | Segment 4 |
| Data 5 | Segment 5 |

FIG. 17A

SYSTEMS METHODS AND COMPUTER PROGRAM PRODUCTS FOR ENCODING AND DECODING TRANSACTION DATA

CROSS-REFERENCE TO RELATED APPLICATION

This application is a continuation of U.S. application Ser. No. 13/031,023, filed Feb. 18, 2011, issued as U.S. Pat. No. 8,418,920 on Apr. 16, 2013, priority of which is claimed under 35 U.S.C. §120 and 37 C.F.R. §1.78(a), and the contents of all of which are incorporated herein by reference as though set forth in full.

BACKGROUND

Embodiments relate to personal finance, and more particularly, to preparation of electronic files such as tax returns and receipt summaries utilizing a financial management system.

Financial management systems such as tax preparation applications or programs including TURBO TAX and TAX CUT have become very popular and allow users to prepare and file a tax return using a computer. Other financial management systems such as transaction or receipt management or tracking applications or programs including QUICKRECEIPTS, QUICKEN, FINANCEWORKS and Mint.com have also become very popular and allow users to enter, receive or import transaction or receipt data using a computer and view, categorize and manage receipt or transaction data and receipt or spending summaries. TURBO TAX, QUICKRECEIPTS, QUICKEN and FINANCEWORKS are registered trademarks of Intuit Inc., Mountain View, Calif., and further details regarding these products are provided in http://myquickreceipts.intuit.com, http://turbotax.intuit.com, http://mint.com, https://quicken.intuit.com, and U.S. application Ser. No. 12/609,922, filed Oct. 30, 2009, the contents of which are incorporated herein by reference as though set forth in full.

During use of a tax preparation application such as TURBO TAX, for example, the tax preparation application presents tax questions or data entry fields to the user as a series of interview pages or screens. In response, the user enters appropriate data or answers, and when the tax return has been completed, the tax return in electronic form may be electronically filed with a tax authority or printed and filed by mail.

For example, certain interview screens, fillable forms or questions may relate to personal and family matters such as the user's marital status, number of dependents, medical expenses, etc. Other interview screens, forms and questions may relate the user's finances as provided in Form-W2. As shown in FIG. 1A, Form W-2 10 includes various types of data including an employee's social security number, employer identification, employer name and address, employee name and address, and Boxes 1-20 for financial data such as wages, federal income tax withheld, social security wages, social security tax withheld, Medicare wages, Medicare tax withheld, types of retirement plans and retirement plan contributions, and state wage and tax data. One manner of preparing a tax return involves manually entering data of Form W-2 10 into respective data entry fields 14 of respective interview screens 12 as shown in FIG. 1B, which illustrates an interview screen 12 with fields 14 for data of Boxes 1-12A of Form W-2.

Referring to FIGS. 1C-D, during use of a receipt management or tracking application or program such as QUICKRECEIPTS, for example, the receipt management application receives or imports transaction data from merchants or retailers or data entered by a user or consumer, generates an interface or receipt summary 20 in which receipts are represented as respective discrete objects or icons 22, and when these icons 22 are selected, users can view additional item-level details 24 about a particular purchase or a specific item. Additional item-level data 24 displayed may include, merchant name, address and contact information, point of sale identifier, cashier identification, store number, date/time, item identification, price, tax, any discount, total amount paid, type of tender, reward or membership number, return policy. A link to a merchant website (e.g., sears.com) can be accessed through one-dimensional bar-code 26 to allow consumer to access merchant website from within an electronic representation of a receipt.

While financial management systems such as tax preparation applications and receipt management applications have greatly simplified preparation of electronic documents such as tax returns and receipt or spending summaries, they nevertheless involve substantial time due to navigating screens or pages and entering tax and transaction data if not automatically imported. In order to address these issues, Optical Character Recognition (OCR) has been utilized to try to simply preparation of electronic documents by reducing the amount of data that is manually entered. With OCR, an image of data such as Form W-2 data is acquired and analyzed by an OCR algorithm, which then imports recognized data into corresponding data entry fields of interview screens. However, there are a number of shortcomings associated with OCR.

For example, using electronic tax returns as an example, OCR may result in inaccurate importation of tax data into respective data fields due to inconsistencies encountered during image capture such as camera quality, lighting, paper condition, print quality (e.g., light printing, smearing, smudges, etc.). Further complications may arise as a result of employers or payroll providers generating Form W-2 or other tax forms with different or inconsistent formats. In these cases, the OCR algorithm may be configured to detect data presented in W-2 forms of a particular format and may not be able to identify certain W-2 data, thereby causing the OCR algorithm to import incorrect or possibly import no data.

Consequently, known OCR systems and methods, while providing some degree of improvement over manual data entry in certain cases, are nevertheless susceptible to factors that negatively impact the ability to accurately read and import data into electronic files, particularly when employers or payroll processors utilize different Form W-2 formats or when merchants utilize different receipt formats.

SUMMARY

One embodiment is directed to a receipt that is generated for a purchase of an item by a consumer from a merchant. The receipt comprises transaction data generated by a computing device of the merchant (e.g., data specifically identifying an item, cost, merchant information, etc.) and a two-dimensional machine readable representation of the item-level transaction data. Thus, in contrast to other receipts, embodiments actually encode transaction data as opposed to providing a code that provides a link or web address to a merchant website.

A further embodiment is directed to a receipt that consists of item-level transaction data generated by a computing device of the merchant, and a two-dimensional machine readable representation of the item-level transaction data.

Yet another embodiment is directed to a receipt generated for a purchase of an item by a consumer from a merchant. The receipt comprises item-level transaction data generated by a computing device of the merchant and a Quick Response (QR) code representing the item-level transaction data. According to embodiments, a first type of item-level transaction data is mapped to a first pre-determined segment of the QR code, a second type of item-level transaction data is mapped to a second pre-determined segment of the QR code, and a third pre-determined segment of the QR code is encoded for verification of the first and second types of item-level transaction data (e.g. using a checksum).

Another embodiment is directed to a computer-implemented method for symbolically representing transaction data generated for a purchase of an item by a consumer from a merchant. The method comprises encoding transaction data into a two-dimensional machine readable representation of the transaction data, and generating a receipt comprising the two-dimensional machine readable representation.

Yet another embodiment is directed to a computer-implemented method for preparing a portion of an electronic receipt summary using a symbolic representation of transaction data of a receipt generated for a purchase of an item by a consumer from a merchant. The method comprises receiving an image of a two-dimensional machine readable representation of transaction data generated when a consumer purchased an item from a merchant and decoding the two-dimensional machine readable representation to determine the transaction data. The method further comprises determining respective fields of the electronic receipt summary for respective transaction data, and populating respective fields with respective transaction data.

According to a further embodiment, a method for preparing a portion of an electronic receipt summary using a symbolic representation of transaction data comprises acquiring an image of a two-dimensional machine readable representation of transaction data using an image capture device of a computing device (e.g., an image generated by a camera and downloaded to a computer or a webcam or scanner of a computer) and populating at least one field of the electronic receipt summary with transaction data decoded from the two-dimensional machine readable representation using the computing device.

Yet another embodiment is directed to a method for preparing a portion of an electronic receipt summary using a symbolic representation tax-related data and a mobile communication device and comprises acquiring an image of a two-dimensional machine readable representation of transaction data using a camera of the mobile communication device such as a Smartphone and populating at least one field of the electronic receipt summary with transaction data decoded from the two-dimensional machine readable representation using the mobile communication device.

Further embodiments are directed to systems for symbolically representing transaction or receipt data as a two-dimensional machine readable code such as a QR code, and decoding such data for use in preparing or updating an electronic receipt summary. Systems may involve computers and/or software programs configured to perform such encoding, decoding and preparation using a computer or mobile communication device. For example, a merchant computer may be configured to perform such encoding and decoding, a mobile communication device or other computing device may be used to acquire an image of the representation, which may be decoded using the mobile communication device and the resulting decoded data is transmitted to a computer hosting a receipt summary software program, or the representation image can be transmitted from the mobile communication device to the host computer, which then decodes the data and prepares a portion of an electronic receipt summary of the consumer. Yet other embodiments are directed to computer program products comprising a non-transitory computer readable storage medium embodying one or more instructions executable by a computer to perform a process for encoding and/or decoding transaction data, which may be used to prepare a portion of an electronic receipt summary.

In a single or multiple embodiments, transaction data that is encoded and decoded is item-level transaction data, e.g., Level III data. The receipt may also identify an identification of the consumer, e.g., by name, membership or club number, or credit card number, and this data may also be encoded into the two-dimensional machine readable representation.

In a single or multiple embodiments, the receipt is an electronic receipt, and an image of the two-dimensional machine readable representation may be acquired when the representation is displayed on the screen or of a printed version of the representation. Further, the receipt may be printed and provided to the consumer, who may then subsequently acquire an image of the representation.

In a single or multiple embodiments, the two-dimensional machine readable representation comprising a two-dimensional matrix. According to one embodiment, the two-dimensional matrix comprising a Quick Response (QR) code such that a first pre-determined segment of the QR code is encoded with a first type of transaction data, and a second pre-determined segment of the QR code being encoded with a second type of transaction data. A third segment may be encoded as checksum to verify the first and second segments.

In a single or multiple embodiments, the two-dimensional machine readable representation is readable utilizing a software program or application that executes on a mobile communication device. In a single or multiple embodiments, after decoding, respective transaction data associated with respective fields from the mobile communication device to a computer hosting an electronic receipt software program such that respective transaction data can be incorporated into respective fields of the electronic receipt summary for an identified consumer utilizing the electronic receipt software program. In another embodiment, the image of the two-dimensional machine readable representation is not decoded using the mobile communication device and is instead transmitted from the mobile communication device to the computer hosting the electronic receipt software program, which then decodes the representation and incorporates resulting transaction data into the electronic receipt summary.

In a single or multiple embodiments, decoding the two-dimensional machine readable representation comprises parsing the image into portions or segments, reading respective portions or segments to determine respective transaction data, which is then included in respective fields of the electronic receipt summary, e.g., according by mapping decoded data to a particular schema utilized by the electronic receipt software program.

BRIEF DESCRIPTION OF THE DRAWINGS

The foregoing and additional aspects of embodiments are described in further detail with reference to the accompanying drawings, wherein:

FIG. 1A illustrates an example of Form W-2 issued to employees, FIG. 1D shows how additional item-level data is presented to a user in response to selecting a receipt object;

FIGS. 8A-B illustrate an embodiment of a tax document or form including alpha-numeric tax data and a two-dimensional machine readable representation of the same tax data.

FIGS. 9A-C respectively illustrate use of a mobile communication device, a scanner and a webcam for acquiring an image of a two-dimensional machine readable representation to be decoded into tax data according to various embodiments;

FIG. 13 generally illustrates how decoded data and/or an image of a machine readable representation can be transmitted from a computer or mobile communication device to another computer or mobile communication device, which may then be used to decode the representation as necessary and prepare a portion of an electronic tax return with decoded data;

DETAILED DESCRIPTION OF ILLUSTRATED EMBODIMENTS

Figure 2A:
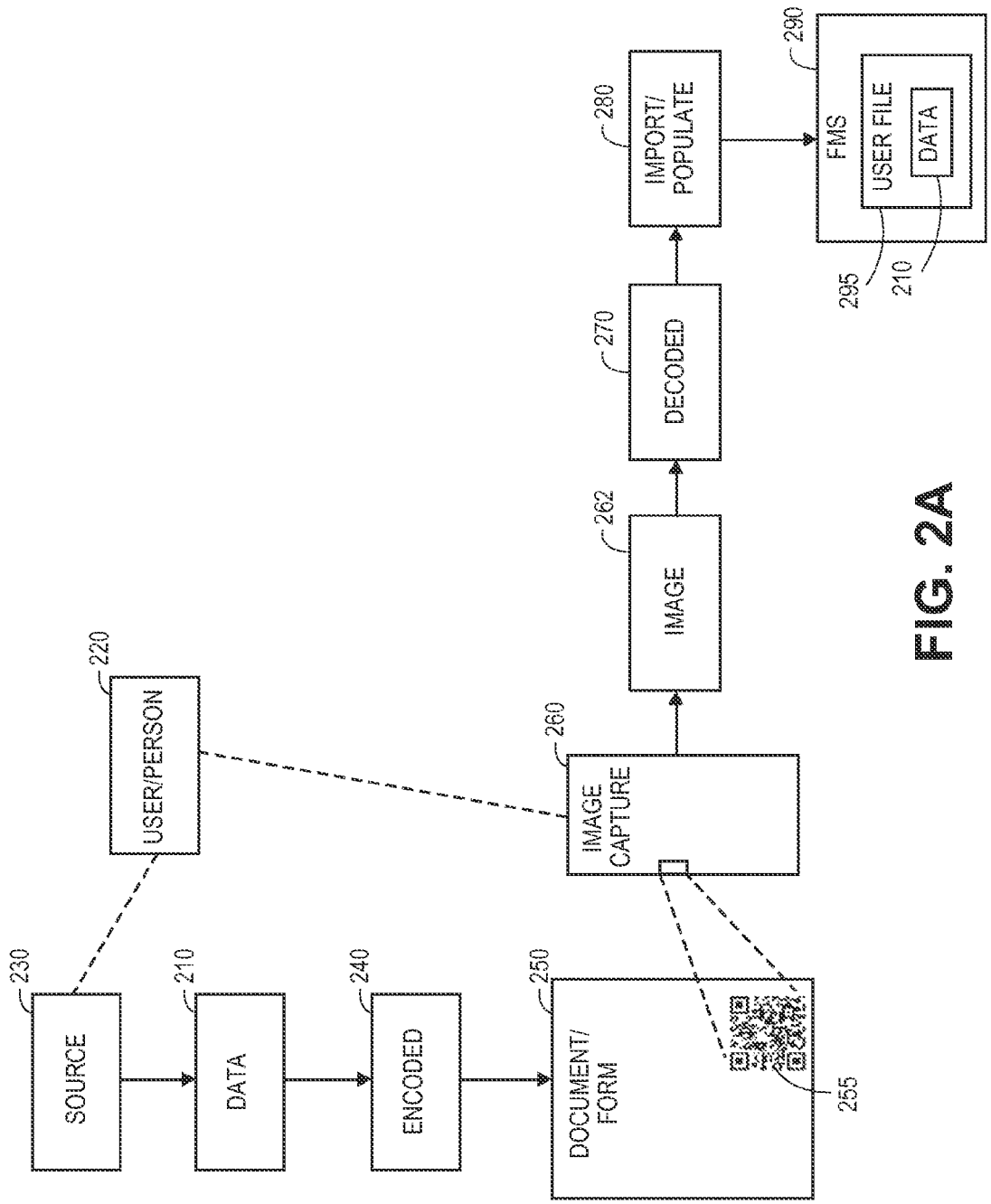
FIG. 2A is block diagram of a system and how system components are utilized to symbolically represent or encode and decode personal data generated by someone other than the person for whom it was generated, and how such data can be incorporated into an electronic file.

Referring to FIG. 2A, certain embodiments relate to systems, methods and computer program products for encoding data 210 of or related to a specific individual or entity 220 (generally, "individual" or "person") and that is generated by a source 230 other than the individual 220. The dotted line in FIG. 2A is intended to illustrate that person 220 has a relationship with source 230 and/or owns an image capture device 260.

Figure 1A:
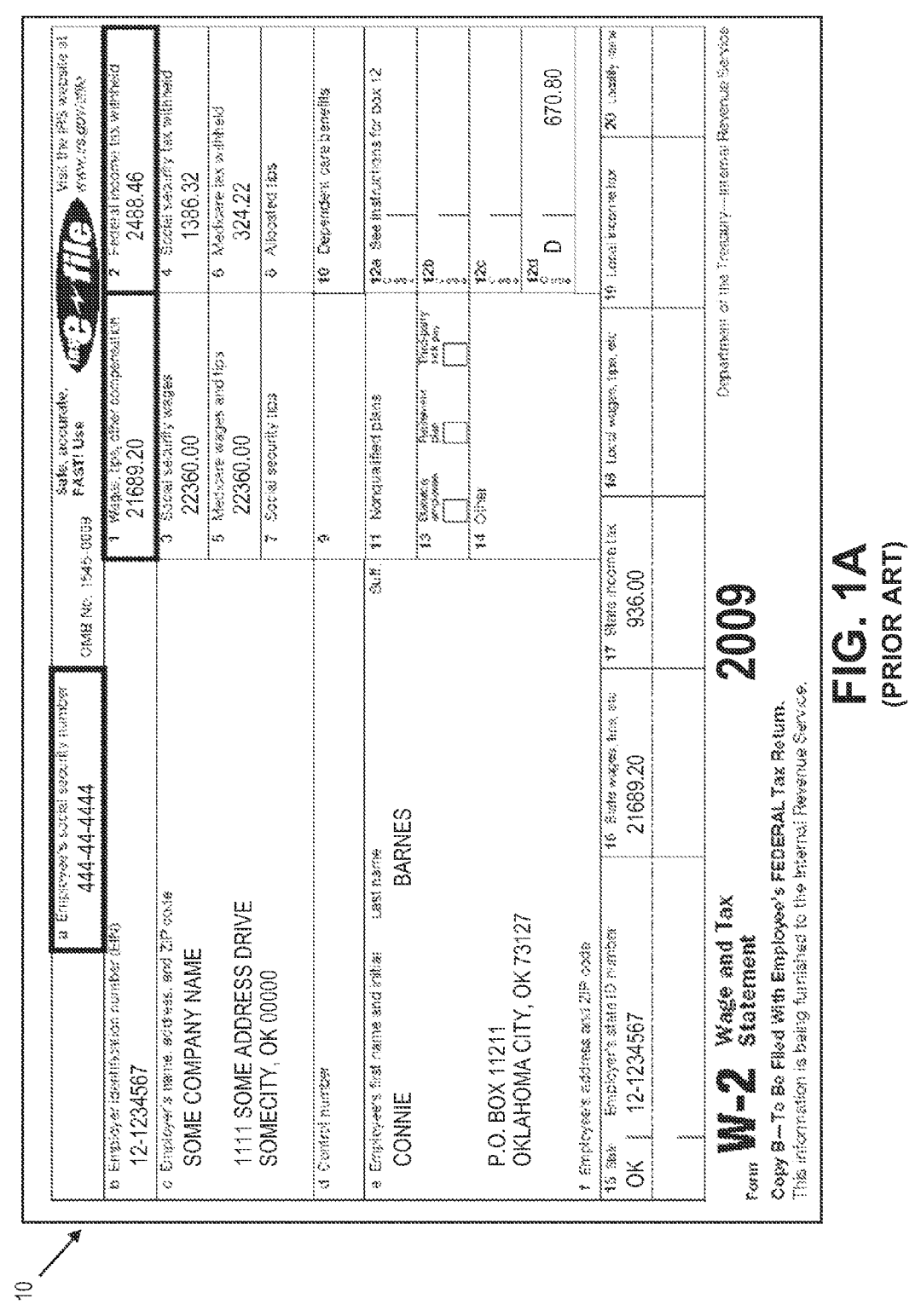
Figure 1B:
FIG. 1B illustrates an example of an interview screen generated by a tax preparation program and including fields to be populated with data from Form W-2.
Figure 2B:
FIG. 2B illustrates an example of a two-dimensional QR CODE that may be utilized in embodiments.

Embodiments may involve, for example, data 210 of a tax document (e.g., Form W-2 as shown in FIG. 1A) for a particular employee 220, data 210 of a receipt generated for particular items purchased by a particular consumer 220, data 210 of a medical file generated for a particular patient 220, data 210 of a legal document generated for a particular client 220. Such personalized or individual-specific data 210 may be generated by source 230 such as an employer, payroll service, merchant, hospital or law firm. Data 210 generated by source 230 is encoded 240 or transformed into a two-dimensional representation or code 255 such as a data matrix or Quick Response (QR CODE) (an example of which is shown in FIG. 2B), which is included in a document 250 generated by source 230. Document 250 may be a tax document (e.g., a hybrid form W-2 including QR CODE), a hybrid receipt including QR CODE 255, a hybrid medical record including the QR CODE 255, a hybrid legal paper including QR CODE 255, or other personalized or individual-specific document. Representation or QR CODE 255 is later decoded 270 to determine the data previously encoded. For example, decoding 270 may be performed when preparing an electronic file 295 such as an electronic tax return, electronic receipt summary, an electronic medical record (e.g., medical history, allergies, etc.) or legal document.

For purposes of decoding 270 QR CODE, an image capture device 260 of a mobile communication device or computer is utilized to obtain an image 262 of QR CODE 255. Image 262 is decoded 270 by a decoding program, which may be a stand-alone program or part of a financial management system (FMS) 290 such as a tax preparation application executing on the mobile communication device or computer. Portions of user file 295 such as an electronic tax return can be populated 280 with decoded data 210. Embodiments enable preparation of a complete electronic tax return 295 by scanning representations such as QR CODEs 255 using, for example a Smartphone, and electronically filing the completed tax return 295 from the Smartphone with a tax authority.

In this manner, and in contrast to known systems and methods, embodiments do not rely on or involve OCR and eliminate or mitigate OCR's shortcomings and inconsistencies such as camera quality, lighting, paper condition, print quality (e.g., light printing, smearing, smudges, etc.). Instead, embodiments utilize a two-dimensional code format that can be verified as accurate, and the manner in which encoding and decoding are performed allows different document formats to be utilized, whereas more rigid and limited systems such as OCR may not be programmed to process other document formats. With enhanced data accuracy and reliability, users are able to import decoded data into an electronic tax return or other electronic document more easily than with OCR and with a higher degree of confidence that the data is correct.

Further aspects of how embodiments may be implemented to prepare portions of various types of electronic documents are described with reference to FIGS. 3-23B. Embodiments related to acquiring an image of a code or representation for use in preparing an electronic tax return are described with reference to FIGS. 3-13, and embodiments related to acquiring an image of a code or representation for use in preparing an electronic receipt summary are described with reference to FIGS. 14-23B. Certain details regarding common system components described with reference to FIGS. 3-13 are not repeated when discussing embodiments with reference to FIGS. 14-23B, and the same or similar components are identified with similar numeric identifiers.

Tax Data/Electronic Tax Return

Figure 3:
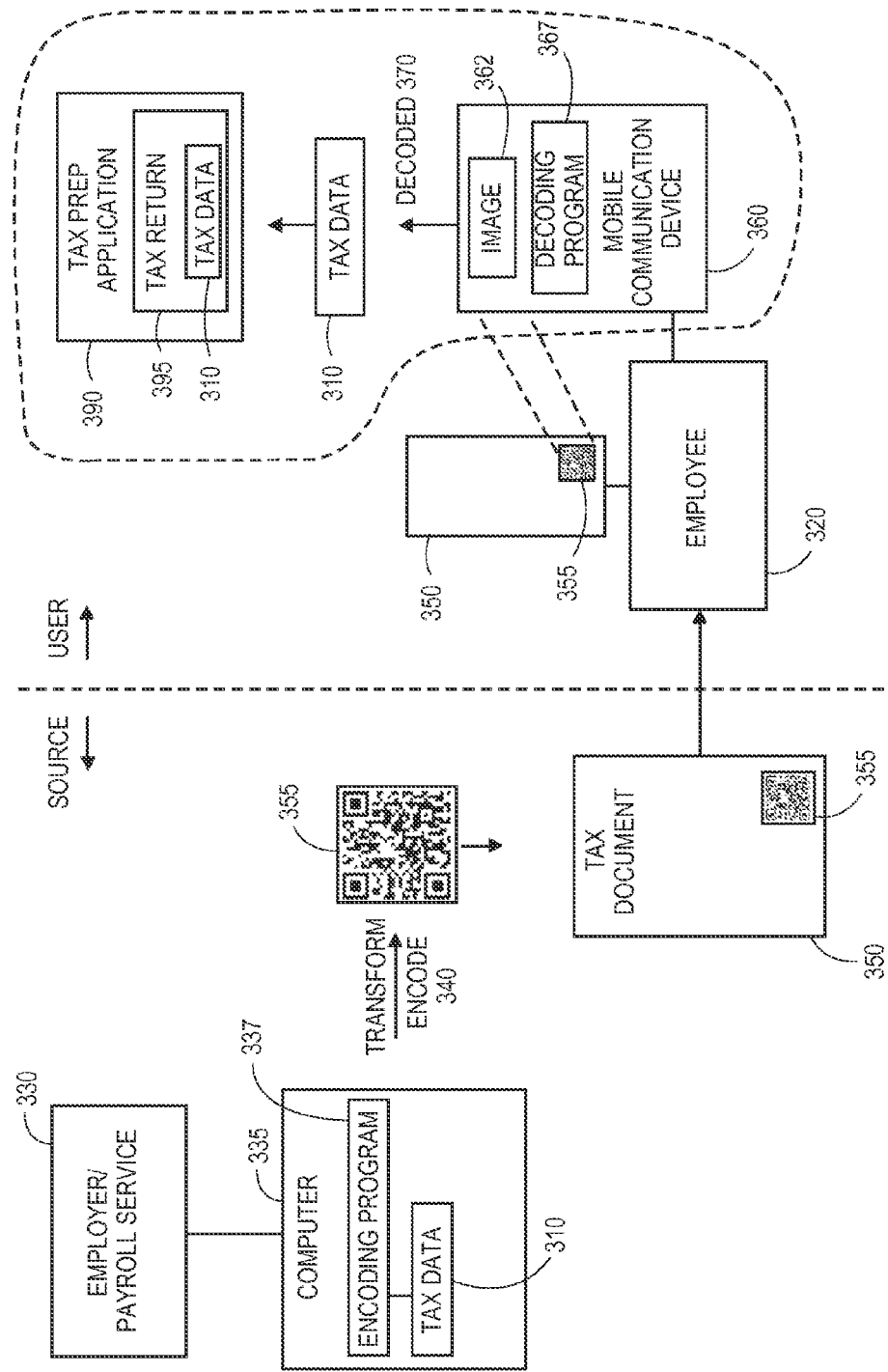
FIG. 3 is a block diagram of a system constructed according to one embodiment for use in symbolically representing or encoding and decoding tax data to be included in a tax return.
Figure 4:
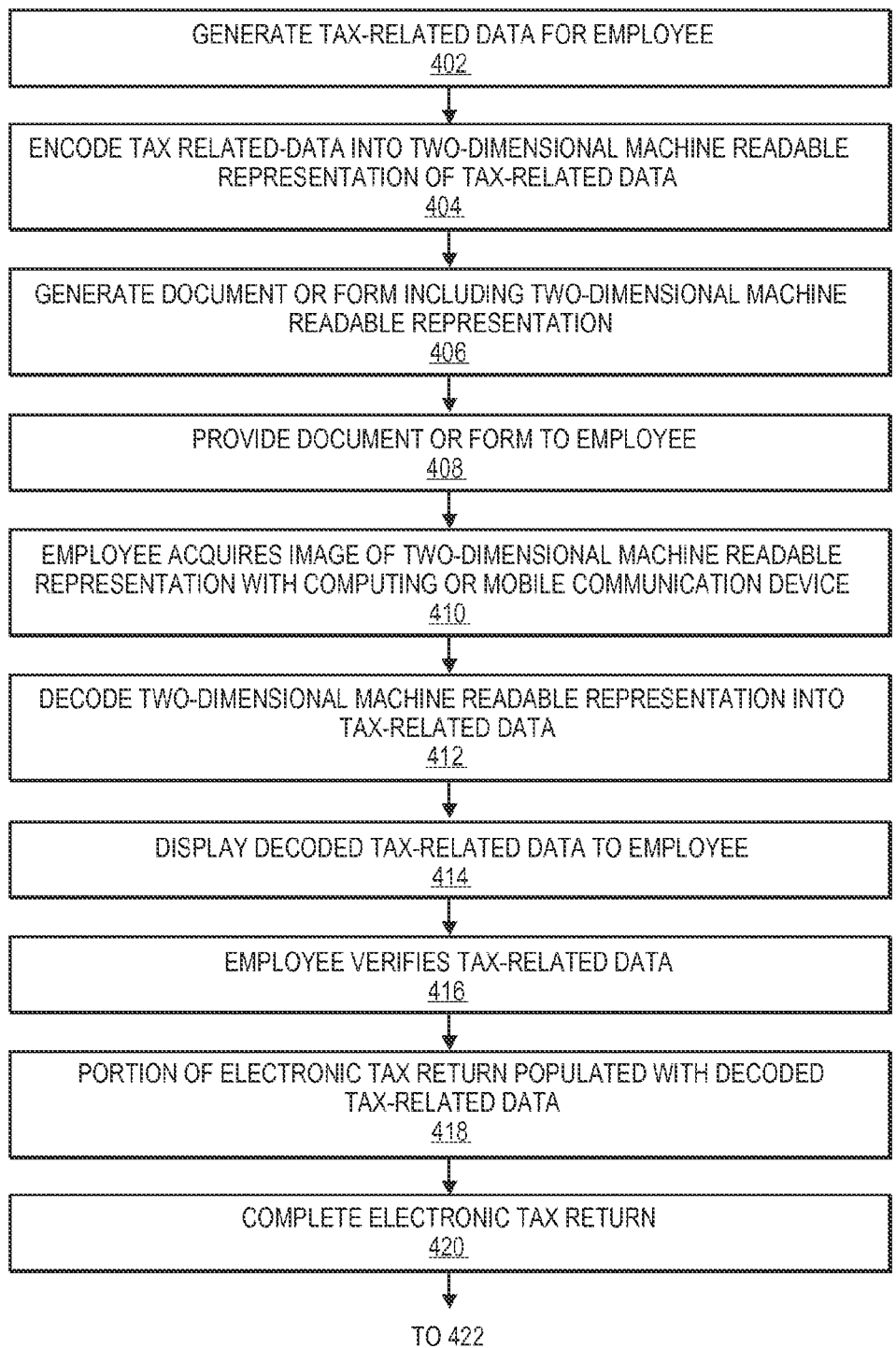
FIG. 4 is a flow diagram of one embodiment of a method for encoding and decoding tax data and preparing an electronic tax return based at least in part upon tax data decoded from a two-dimensional machine readable representation of tax data.
Figure 4:
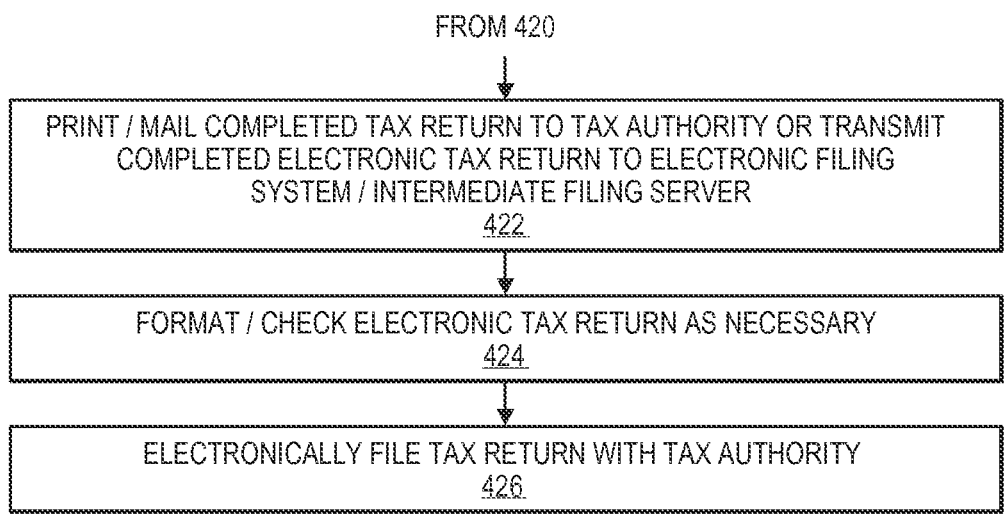

Referring to FIG. 3, a system 300 constructed according to one embodiment involves a tax document and encoding and decoding tax data 310 for purposes of preparing an electronic tax return 395. With further reference to FIG. 4, a method for encoding and decoding data for use in preparing an electronic tax return 395 using system 300 shown in FIG. 3 involves, at 402, a source 330 such as an employer utilizing source computer 335 to generate tax data 310 for an employee.

Source 330 may be an employer or payroll processor such as INTUIT INC., which manages processes payroll, files and pays employer taxes, and creates and distributes W-2 forms to employees at the end of the year on behalf of an employer. For ease of explanation, reference is made to source or employer 330, and these terms are defined as including the employer itself or other entities such as a payroll processor that acts on behalf of an employer.

According to one embodiment, employer 330 utilizes computer 335 to generate tax data 310 such as Form W-2 data as shown in FIG. 1A. Tax data 310 is defined to include numerical and/or financial data (such as wages, taxes, etc.) and other data included in an electronic tax return 395 such employee and employer identification (e.g., employee name and address, social security number, employer identification and address, etc.) While certain embodiments are described with reference to employer 330 generating tax data 310 of Form W-2, it will be understood that embodiments may involve other sources 330 of different types or categories of tax data 310 of other tax forms or documents including, but not limited to, 1099-G, 1099-INT, 1099-OID, 1099-MISC, 1099-B, 1099-R, 1098-E, 1098-T, 5498 and other forms. Such tax data 310 may be generated by various sources 330 including, but not limited to a financial institution (e.g., bank, credit union, etc.) that paid interest to individual 320 or that holds a mortgage of a homeowner, a brokerage firm (such as AMERITRADE, E-TRADE, SCOTTTRADE, etc.) through which dividends were paid to an individual or that completed purchase and/or sales of securities held within a brokerage account on behalf of an individual 320. For ease of explanation and illustration, reference is made to an employer 330 that generates tax data 310 that is normally included in Form W-2, but embodiments may involve various sources 330 of different types of tax data 310 for employees 320, holders of interest and dividend paying accounts, holder of a mortgage, etc.

According to embodiments, an encoding program 337 executes on employer computer 335 and is programmed, configured or operable to encode 340 tax related-data 310 generated by employer 330 into a two-dimensional machine readable representation 355 of tax data 310 at 404 (as opposed to a one-dimensional or linear code). Thus, tax data 310 is actually encoded and symbolically represented as a two-dimensional symbol or code 355 such as a data matrix or QR CODE (an example of which is shown in FIG. 2B). For ease of explanation, reference is made to a two-dimensional machine readable representation or code in the form of a QR CODE 355.

Figure 5:
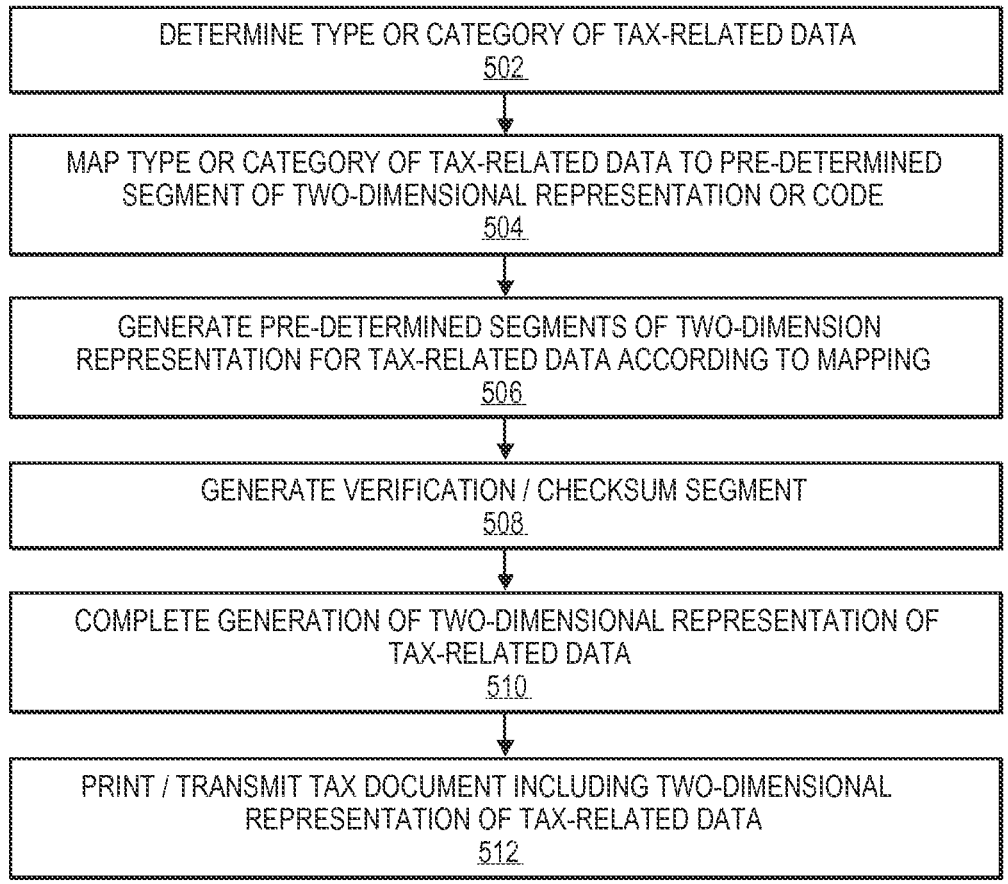
FIG. 5 is a flow diagram of one embodiment of a method for encoding tax data and generating a tax form or document including a two-dimensional machine readable representation of tax data.

Referring to FIG. 5, encoding tax data 310 into QR CODE 355 involves, at 502, encoding program 337 determining or identifying a type of category of tax data 310 to be encoded. Types or categories utilized may be the same types or categories of data utilized with known tax forms such as Form W-2, which specifies categories or types of tax data 310 such as "Wages, tips, other compensation," "Federal income tax withheld," "Social security wages," etc. as shown in FIG. 1A.

Figure 6B:
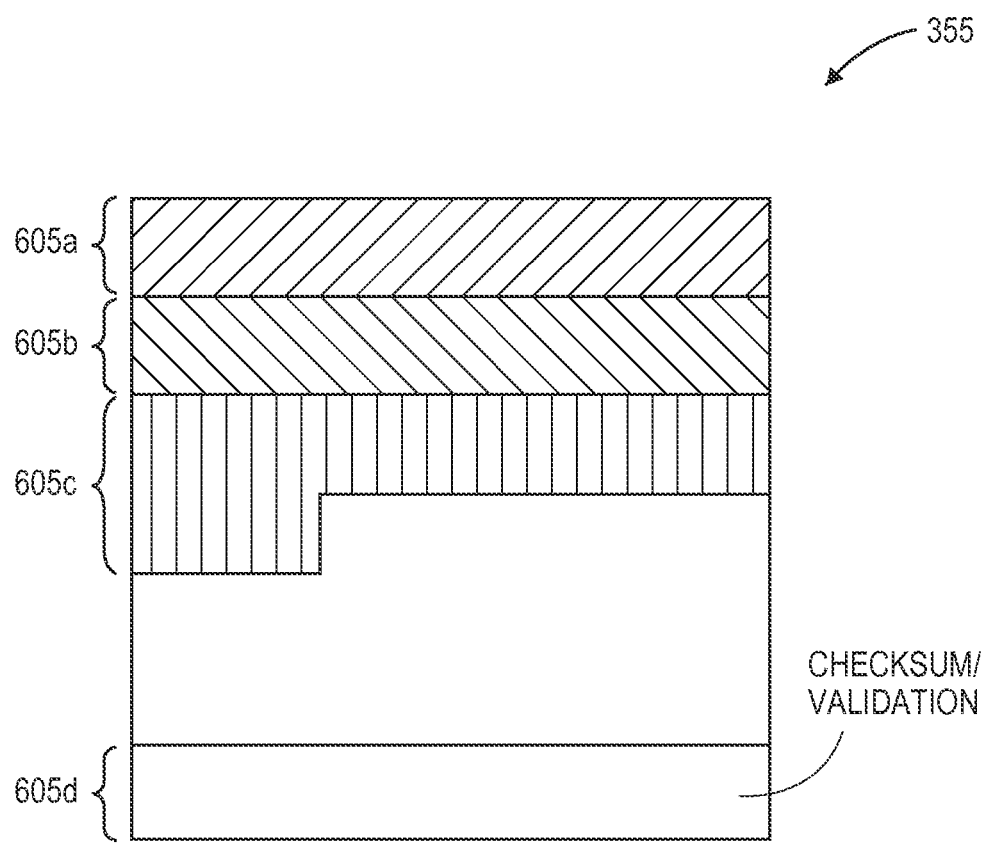
FIG. 6A illustrates a table utilized by embodiments to determine which segment of a two-dimensional machine readable representation should be utilized to encode a particular type or category of tax data, and FIG. 6B generally illustrates how segments or groups of data elements of a two-dimensional machine readable representation are utilized for encoding tax data using the table shown in FIG. 6A.
Figure 7:
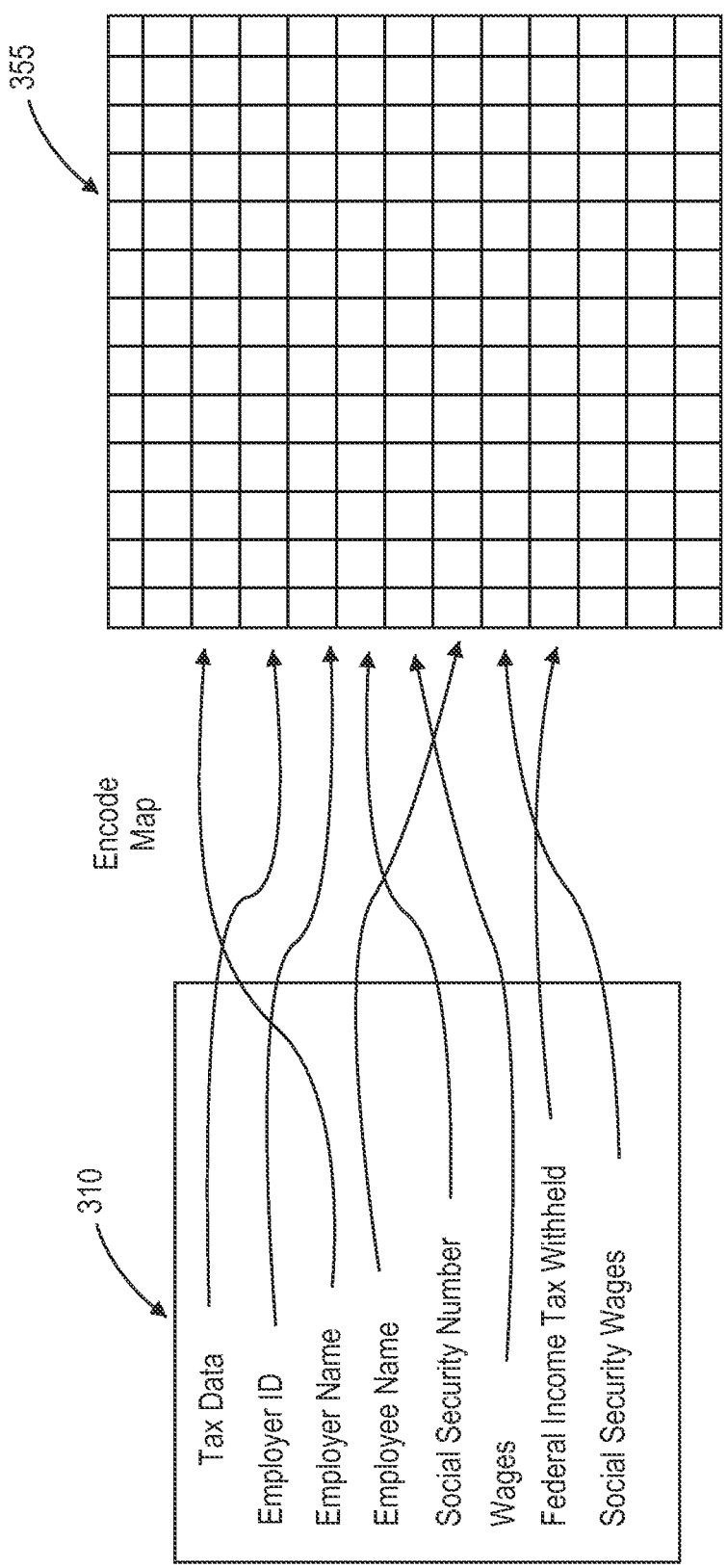
FIG. 7 illustrates how respective tax data is encoded as or transformed into respective segments of a two-dimensional machine readable representation based at least in part upon mapping and segmentation shown in FIGS. 6A-B.

With continuing reference to FIG. 5, and with further reference to FIGS. 6A-B and 7, at 504, encoding program 337 maps the type or category of tax data 310 to a pre-determined segment 605 of QR CODE 355 using table 600 with columns 602a-b for data category or type and corresponding QR CODE segment 512, or another suitable mapping mechanism. At 506, pre-determined segments 502 are generated according to mapping table 600 and represent tax data 310 as generally illustrated in FIG. 7.

For example, a first type of tax data 310a is encoded as or transformed into a first pre-determined segment 605a of QR CODE 355, a second type of tax data 310b is encoded as or transformed into a second pre-determined segment 605b of QR CODE 355, and so on for other segments 605c and other types of tax data 310. At 508, a certain segment 605d of QR CODE 355 can be a verification segment that confirms encoded data is accurate. For example, one or more checksums or hash sums may be generated for one or multiple pre-determined segments 502c of QR CODE 355 to verify encoded data.

It will be understood that FIGS. 6A-B and 7 are not intended to illustrate the exact segments 502 that are encoded, and that a QR CODE 355 may include a partial or complete row or multiple rows of data elements representing a certain type of tax data 310. Further details regarding how two-dimensional matrix codes such as QR CODEs 355 are structured (e.g. data for version information, format information, data and error correction segments or keys, and position, alignment and timing indicators) are not discussed in further detail since they are known to persons of ordinary skill in the art.

Referring again to FIG. 4, and with continuing reference to FIG. 5, at 510, encoding program completes generation of the QR CODE that is encoded with or represents tax data, and at 512, a document including the generated QR CODE is printed and/or transmitted and provided to employee at 408.

Figure 8B:
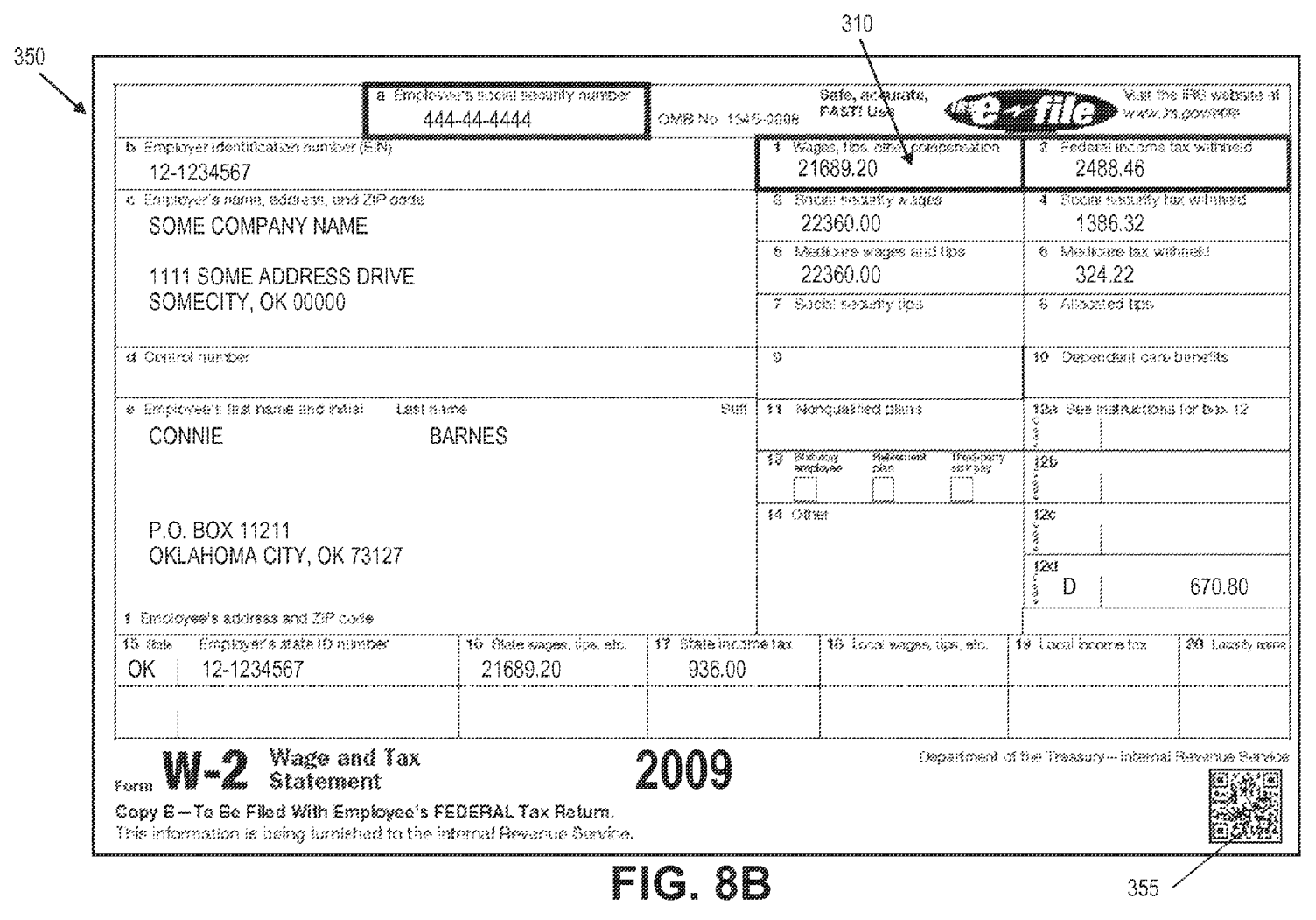

Referring to FIGS. 8A-B, according to one embodiment, the result of encoding program 337 is generation of a tax document or form 350 that includes tax data 310 (e.g., data generated by employer and normally included in a Form W-2 and/or other tax form) and, in addition, QR CODE 355 representing tax data 310. Thus, in the illustrated embodiment, tax document 350 includes tax data 310 in one form (alphanumeric) and the same tax data 310 in a different, transformed form of QR CODE 355. Thus, embodiments generate a hybrid form of a currently known W-2 form, and utilize QR CODE 355 to encode the same tax data 310 as opposed to other known methods that utilize a QR CODE 355 as a link to a website or other unrelated data.

Figure 8C:
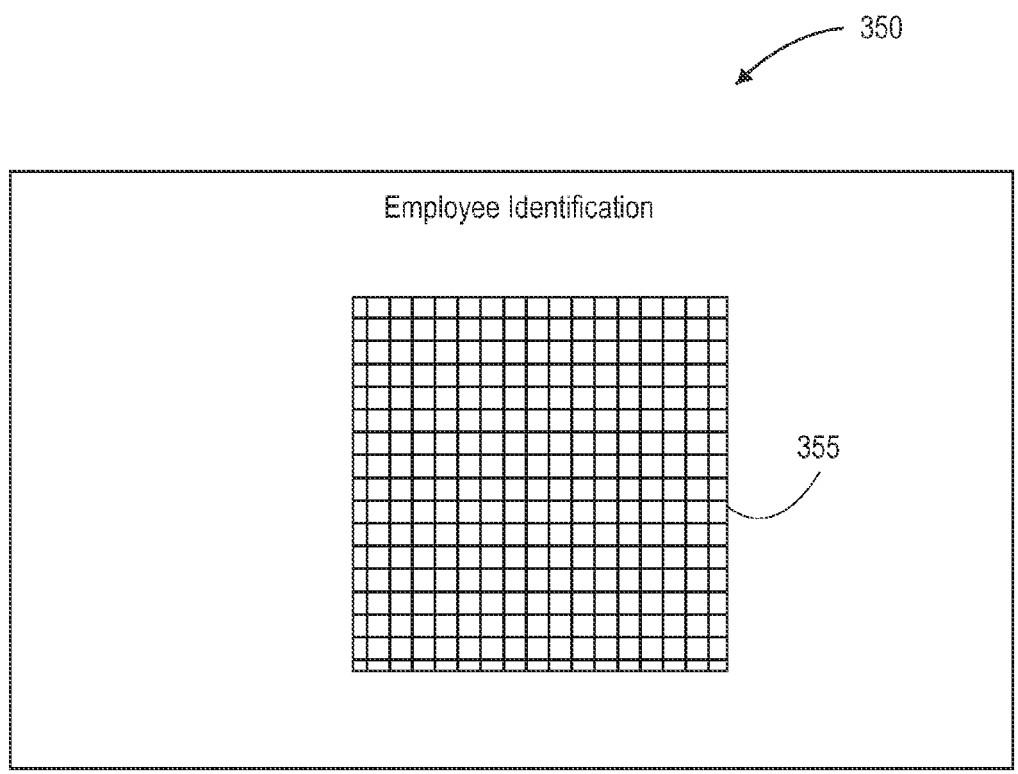
FIG. 8C illustrates one embodiment of a tax document or form having an employee identification and a two-dimensional machine readable representation of tax data including tax data provided elsewhere within the document.

Referring to FIG. 8C, according to another embodiment, a tax document 350 generated by source 330 with encoding method embodiments includes data such as an identification of the employee 802, but no numerical financial data. Instead, numerical financial data and other tax data are encoded as or transformed into QR CODE 355 as shown in FIG. 9. Thus, in the illustrated embodiment, the tax document 350 includes employee identification 802 and the resulting QR code 355 and other tax data 310 is not displayed on document 350 since such data can be protected from disclosure until decoded. Thus, FIGS. 8A-C illustrate that a tax document 350 generated according to embodiments includes the resulting QR CODE 355 representing tax data 310 and may also include tax data 310 itself. In other words, FIGS. 8A-C illustrate that a tax document 350 may include, for example, numerical tax data 310 in one or multiple formats.

Figure 9A:
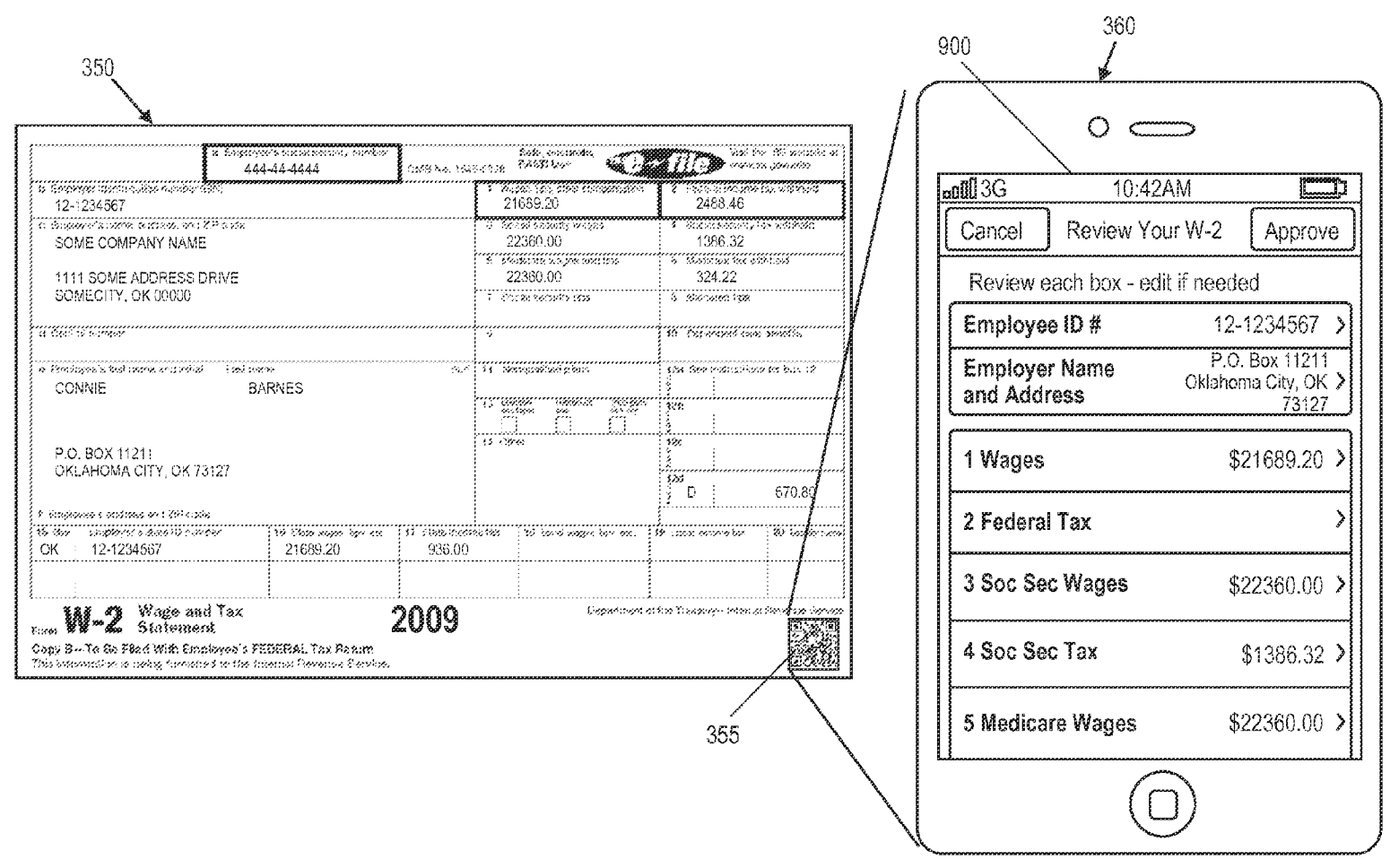
Figure 9B:
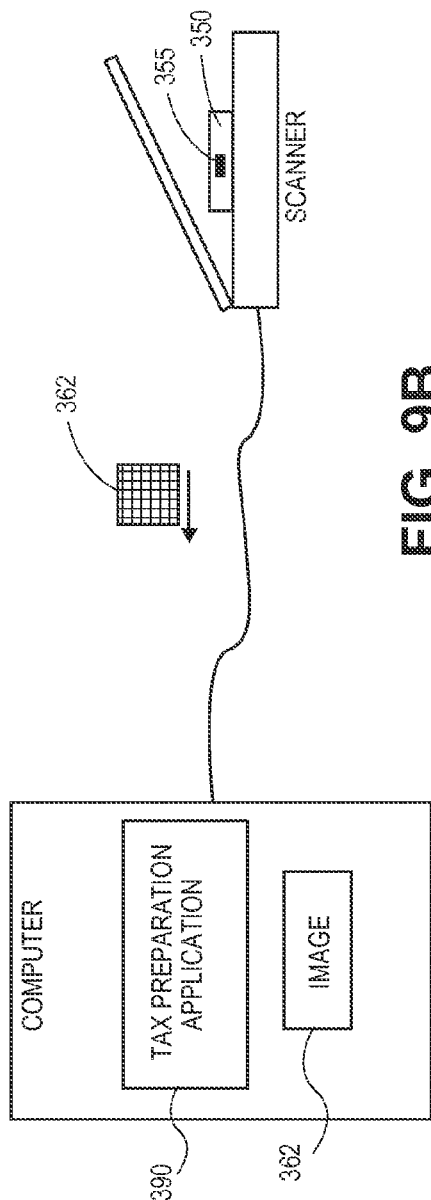
Figure 9C:
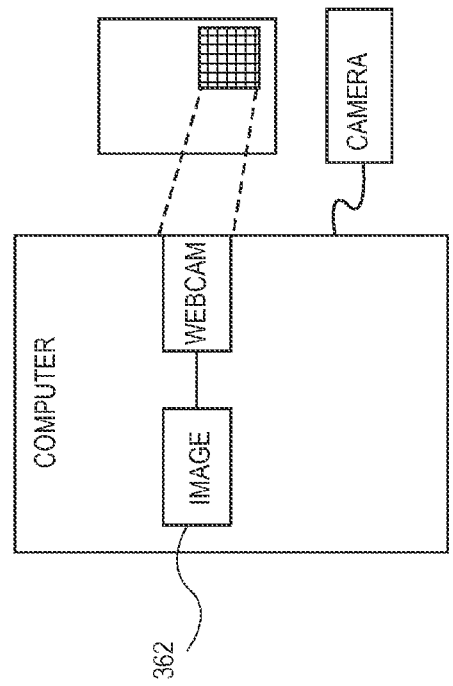

Referring again to FIGS. 3-4 and with further reference to FIGS. 9A-C, at 410, employee 320 acquires an image 362 of QR CODE 355 using a camera or other image capture device 360 of a mobile communication device or a computer. FIG. 9A illustrates an embodiment in which a camera 902 of a mobile communication device 900 in the form of a Smart-phone is utilized to acquire image 362 of QR CODE 355. Mobile communication device is defined to include cellular telephones, Smartphones such as an IPHONE, IPOD TOUCH, ANDROID, BLACKBERRY and other mobile communication devices 110 such as a laptop computer, a Personal Digital Assistant (PDA), a computing tablet such as an IPAD and other mobile communication device 110 capable of wireless or cellular communications. For ease of explanation, reference is made generally to mobile communication device 110, one example of which is a Smartphone.

Other embodiments may involve acquiring an image 362 of QR CODE 355 in different ways, e.g., using a scanner 912 of a computer 910 (as shown in FIG. 9B) or a webcam 922 (as shown in FIG. 9C). Further, employee 320 may take a picture 362 of QR CODE 355, and electronically transfer the digital image 362 from the camera to a computer 910 or mobile communication device 900. Further, employee 320 may take a picture 362 of QR CODE 355 and scan the picture 362 with scanner 912. Thus, it will be understood that image 362 can be acquired in different ways using different types of image capture devices 360. For ease of explanation, reference is made to using a camera 902 of a mobile communication device 900 such as a Smartphone or tablet computing device having a camera 902.

Figure 10:
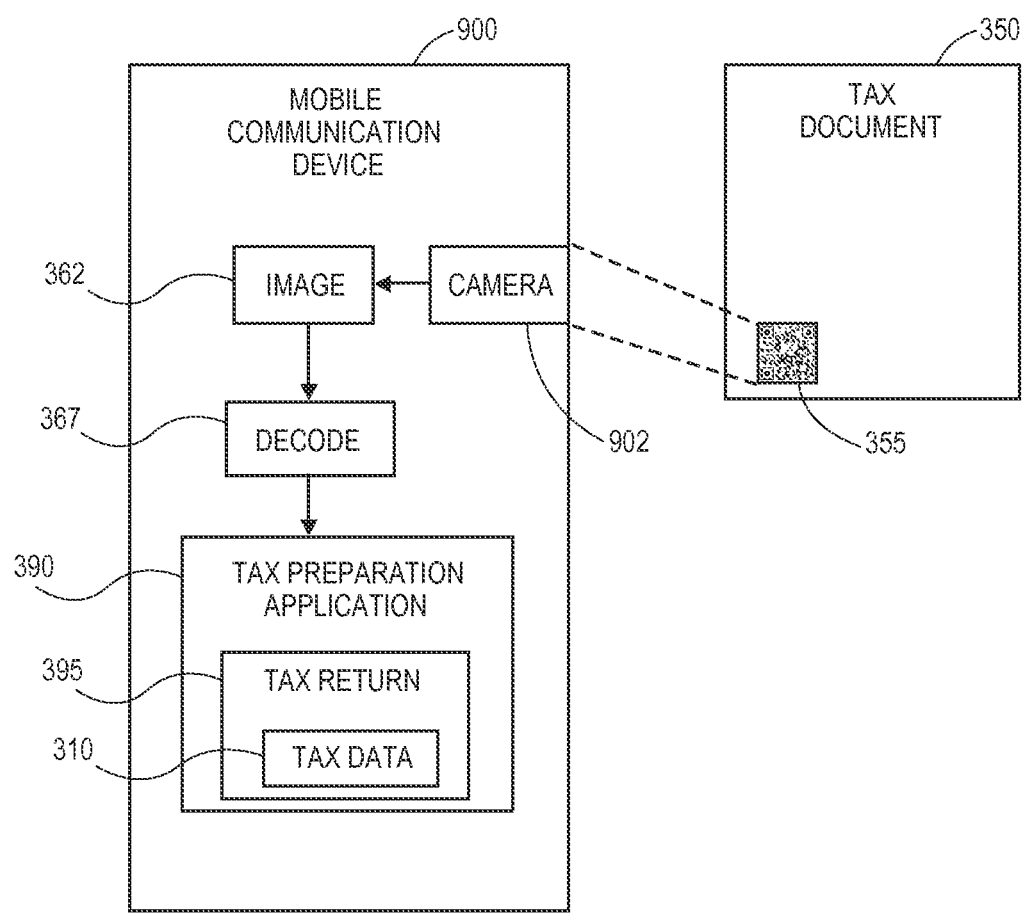
FIG. 10 illustrates components of a mobile communication device configured according to embodiments for use in acquiring an image of a two-dimensional machine readable representation, decoding the representation, and preparing at least a portion of an electronic tax return.
Figure 11:
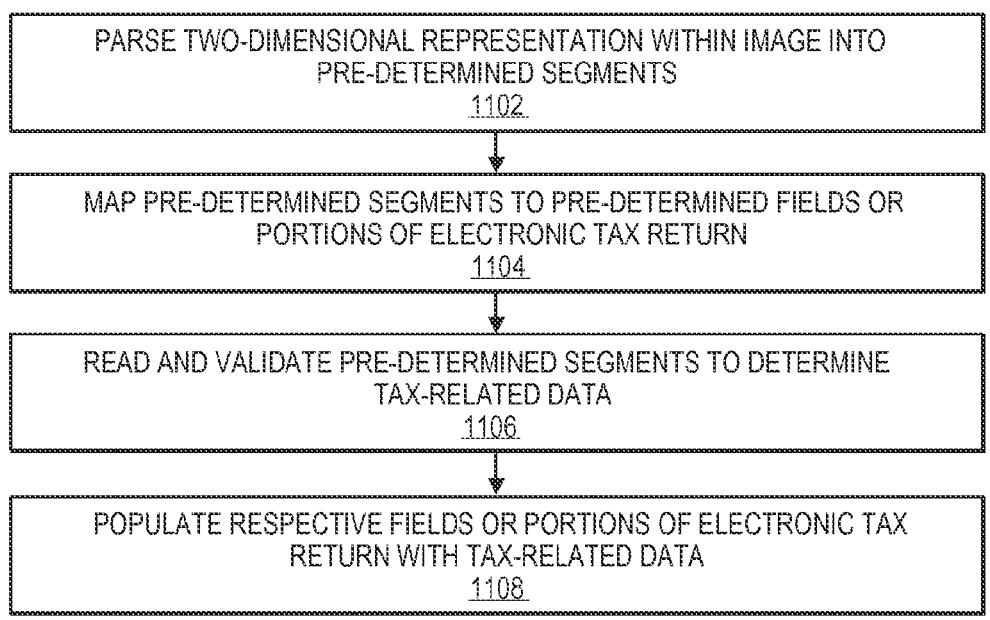
FIG. 11 is a flow chart of one embodiment of a method for decoding a two-dimensional machine readable representation to determine corresponding tax data to be included in an electronic tax return.

Referring to FIG. 10, image 362 acquired using camera 902 of mobile communication device 900 such as a Smartphone is provided as an input to a decoding program 367, the output of which is provided to a tax preparation application 390 that is used to prepare an electronic tax return 395. In the illustrated embodiment, the tax preparation application 390 executes on the mobile communication device 900, which may be utilized to prepare at least a portion of electronic tax return 395. Further, while decoding program 367 and tax preparation application 390 are shown as separate programs in the illustrated embodiment, in other embodiments, decoding program 367 is a part, program or module of tax preparation application 390.

Figure 12A:
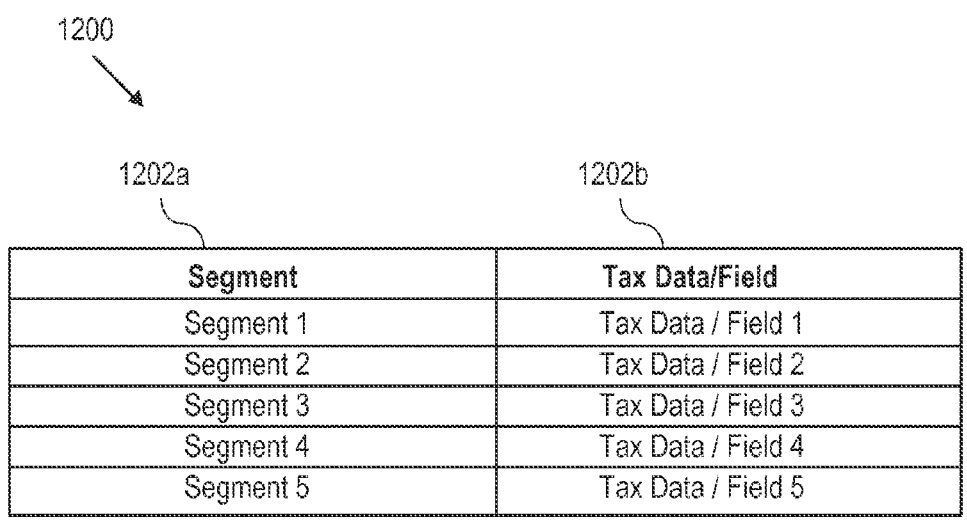
FIG. 12A a table utilized by embodiments to determine which segments of a two-dimensional machine readable representation represent corresponding types of tax data or sections of an electronic tax return, FIG. 12B generally illustrates how certain segments are decoded to determine tax data using the table of FIG. 12A.
Figure 12B:
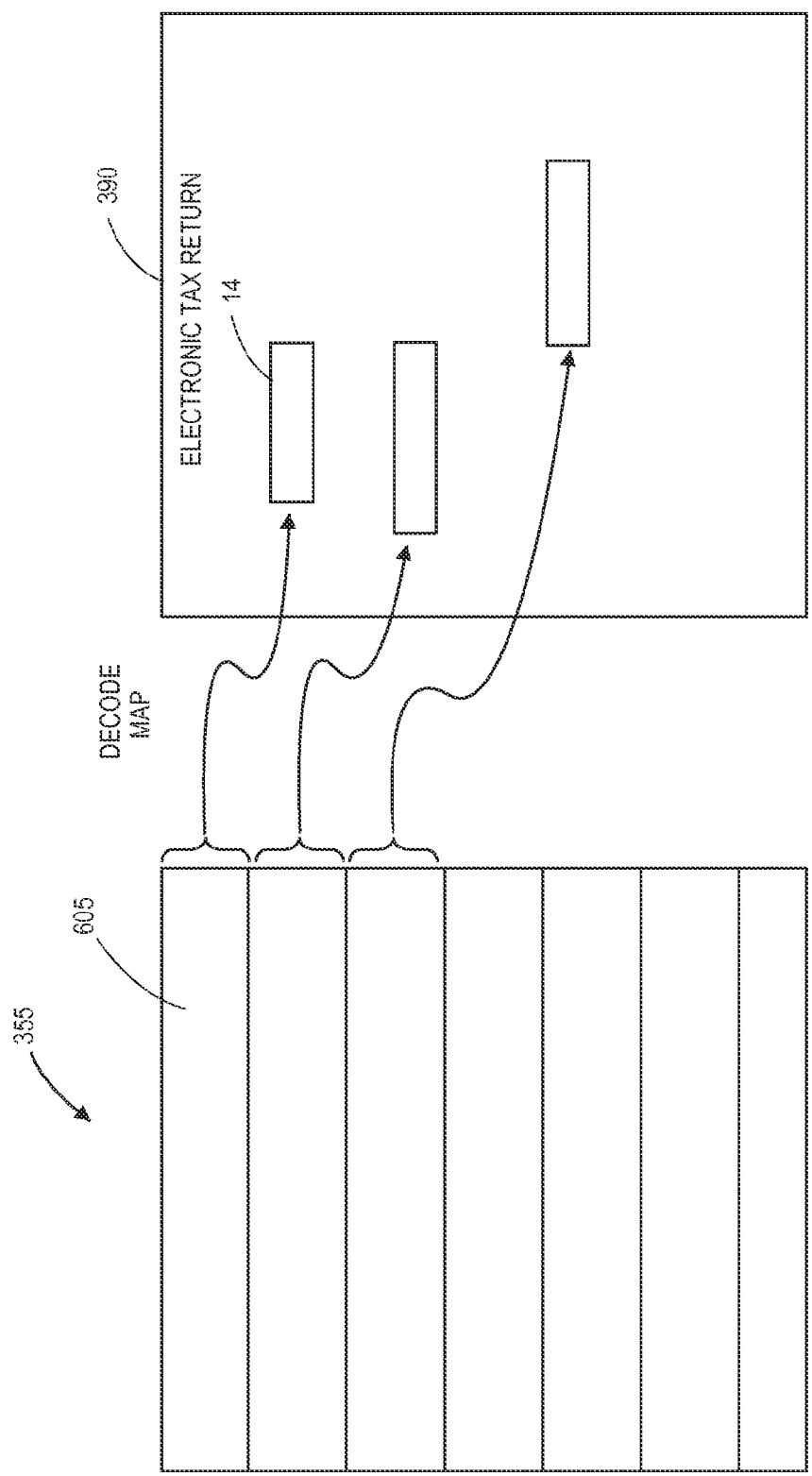
FIG. 12C illustrates an example of respective fields of an interview screen generated by a tax preparation application populated with decoded data.
Figure 12C:
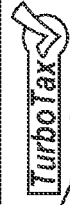

Thus, referring again to FIG. 4, at 412, QR CODE 355 is decoded 370 to determine tax data 310 corresponding to pre-determined segments 605 of QR CODE 355. For this purpose, referring to FIG. 11, at 1102, decoding program 367 parses QR CODE 355 of acquired image 362 into pre-determined segments 605 (e.g. according to a pre-determined segmentation), and at 1104, maps the pre-determined segments 605 to pre-determined fields or portions of electronic tax return 395 as generally illustrated in FIGS. 12A-B, e.g., using a table 1200 with columns 1202a-b mapping segments 605 to types of data or locations of fields within an interview screen of tax preparation application 395. At 1106, decoding program 367 reads and validates decoded tax data 310, e.g., based on a checksum or other verification tool that was encoded when tax data 310 was initially encoded. At 1108, decoding program 367 populates respective fields or portions of electronic tax return 395 with respective tax data 310 decoded from QR CODE 355, as generally illustrated in FIG. 12C.

Referring again to FIG. 4, if necessary, before fields of the electronic tax return 395 are populated with decoded tax data 310, decoding program 367 may display decoded tax data 310 to user 320 at 414, who may then verify that decoded tax data 310 is correct at 416. At 418, electronic tax return 395 can then be populated with user-verified tax data 310. As shown by dashed line in FIG. 3, the image capture, decoding and populating tax return may be performed by the same device, e.g., mobile communication device 360, but in other embodiments, other devices or computers may be involved.

At 420, electronic tax return 395 is eventually completed, either exclusively based on tax data 310 decoded from one or more QR CODES 355 of one or more tax documents and/or by manual data entry. At 422, completed electronic tax return 395 is printed and mailed by user 320 to a tax authority or filed electronically. For electronic filing, electronic tax return 395 may be transmitted to an intermediate electronic filing server (not illustrated in FIG. 3) (e.g. a server of Intuit, Inc.), which formats the electronic tax return 395 as necessary and transmits the electronic tax return 395 to a tax authority (not illustrated in FIG. 3) such as the Internal Revenue Service, a state tax authority, or other tax collecting entity.

According to one embodiment, electronic tax return 395 is completed using only a mobile communication device 900 such as a Smartphone and tax preparation application 390 executing thereon. The completed electronic tax return 395 is then electronically filed from the mobile communication device 900. According to another embodiment, the electronic tax return 395 is partially completed using mobile communication device 900 and partially completed using a computer, and electronically filed from the computer. For this purpose, as generally illustrated in FIG. 13, the image 362 of QR CODE 355 can be transmitted, e.g., in an electronic mail message, from mobile communication device 900 to a user computer 1300 through a network 1301, and decoding program 367 and/or tax preparation application 390 execute on computer 1300 to decode QR CODE 355 and populate electronic tax return 395 with decoded tax data 310. QR code 355 can be transmitted from mobile communication device 900 to one or multiple other computers and/or mobile communication devices, e.g., to a computer or other mobile communication device of the employee and/or accountant of the employee 320.

Communications between system components may involve one or more networks 1301 (one network is generally illustrated) such as a Local Area Network (LAN), a Wide Area Network (WAN), Metropolitan Area Network (MAN), a wireless network, other suitable networks capable of transmitting data, and a combination of such networks. For ease of explanation, reference is made to a network 1301 generally, but various networks, combinations of networks and communication systems, methods and protocols may be utilized.

Transaction Data/Electronic Receipt Summary

Figure 1C:
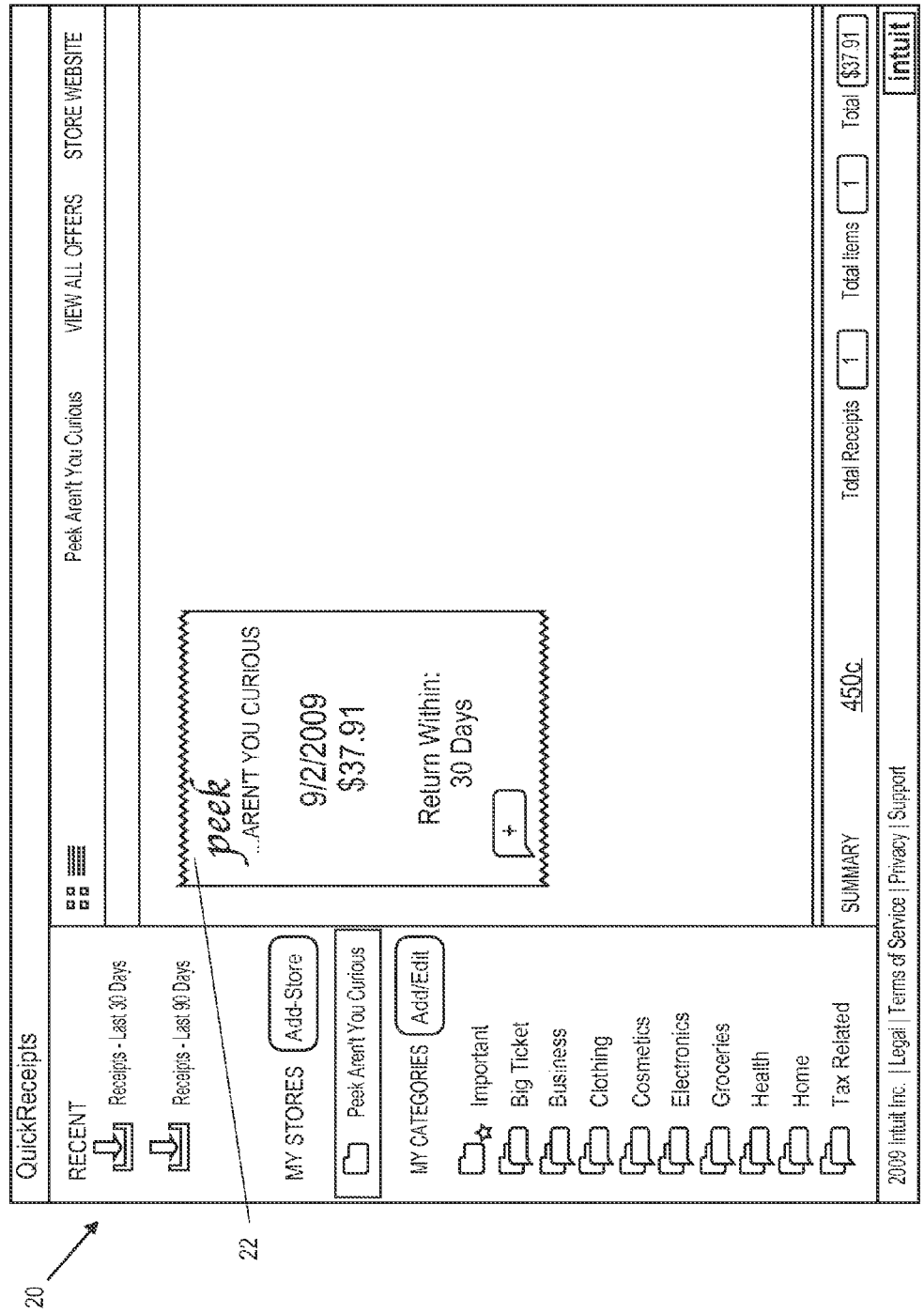
FIG. 1C illustrates how a receipt management program represents a receipt as a discrete object.
Figure 14:
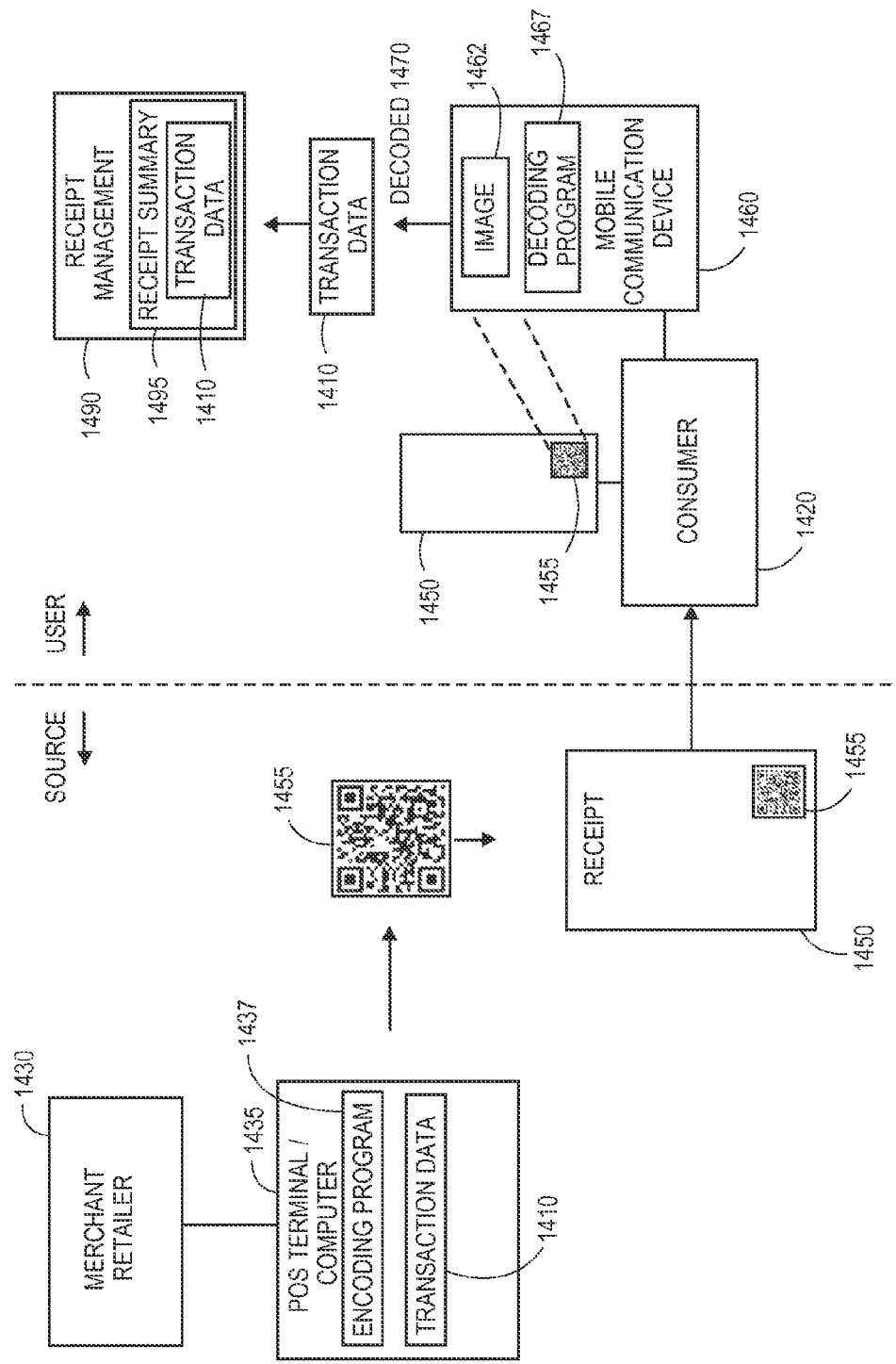
FIG. 14 is a block diagram of a system constructed according to another embodiment for use in symbolically representing or encoding and decoding transaction or receipt data generated by a merchant for a purchase of an item by a consumer and to be included in an electronic receipt summary.

Referring to FIG. 14, a system constructed according to another embodiment involves a receipt document and encoding and decoding receipt or transaction data 1410 (generally, "transaction data") for purposes of preparing an electronic receipt summary 1495 utilizing a financial management system 1490, one example of which is a receipt management software program such as QUICKRECEIPTS, available from Intuit Inc. It will be understood that embodiments or aspects thereof may involve or be embodied in other financial management systems and other receipt management software programs, and QUICKRECEIPTS is provided as one example of how embodiments may be implemented. With a receipt management software program 1490, a consumer 1420 purchases one or more items from a merchant or retailer 1430 (generally, "merchant" 1430), and merchant 1430 sends to a host such as Intuit Inc. electronic item-level receipt data, such as Level III data, which is integrated into an electronic receipt summary 1495, e.g., as described above with reference to FIGS. 1C-D.

Figure 15:
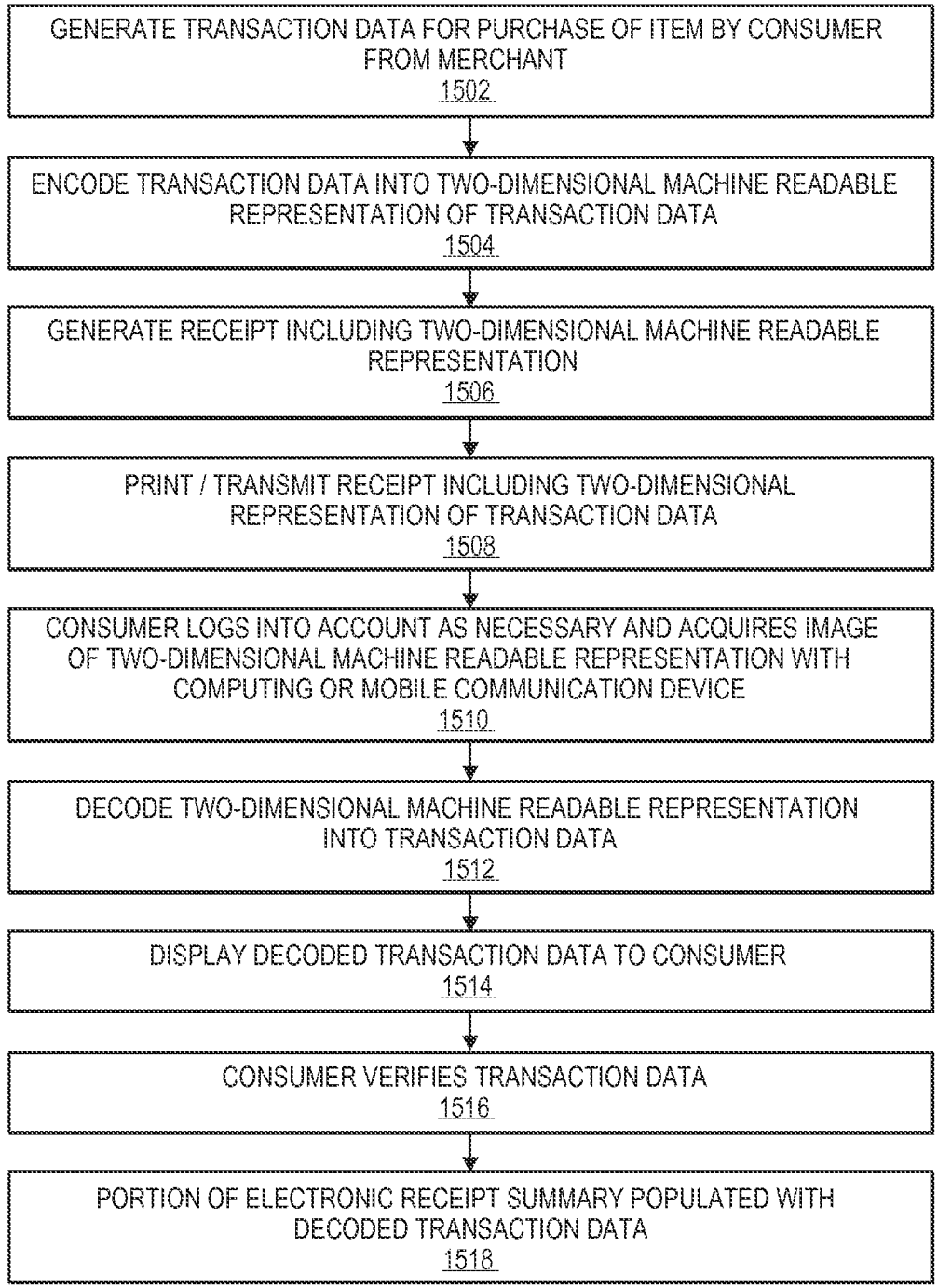
FIG. 15 is a flow diagram of one embodiment of a method for encoding and decoding transaction or receipt data and preparing an electronic receipt summary based at least in part upon transaction data decoded from a two-dimensional machine readable representation of the transaction data.

Referring to FIG. 15, a method for encoding and decoding transaction data using system 1400 components involves, at 1502, a source such as merchant 1430 from whom consumer 1420 purchased an item. Merchant 1430 may be an on-line or brick-and-mortar or store merchant, both of which generate transaction data 1410 for purchases made by consumer 1420. Transaction data 1410 is generated by a merchant computer or transaction processing device such as a Point of Sale (POS) terminal 1435. For ease of explanation, reference is made to source or merchant 1430 and POS terminal 1435. POS terminal 1435 generates item-level transaction data 1410 such as merchant name, address, store number, item identification (e.g., model or serial number or other identification code or information), purchase price, tax, total, etc. Examples of item-level transaction data 1410 are provided in FIG. 1D.

According to embodiments, an encoding program 1437 executes on merchant POS terminal 1435 and is programmed, configured or operable to encode or transform transaction data 1410 into a two-dimensional machine readable representation 1455 of the transaction data 1410 at 1504. Thus, transaction data 1410 is actually encoded and symbolically represented as a two-dimensional symbol or code 1455 (as opposed to a one-dimensional or linear code) such as a data matrix or QR CODE, an example of which is shown in FIG. 2B as discussed above).

Figure 1D:
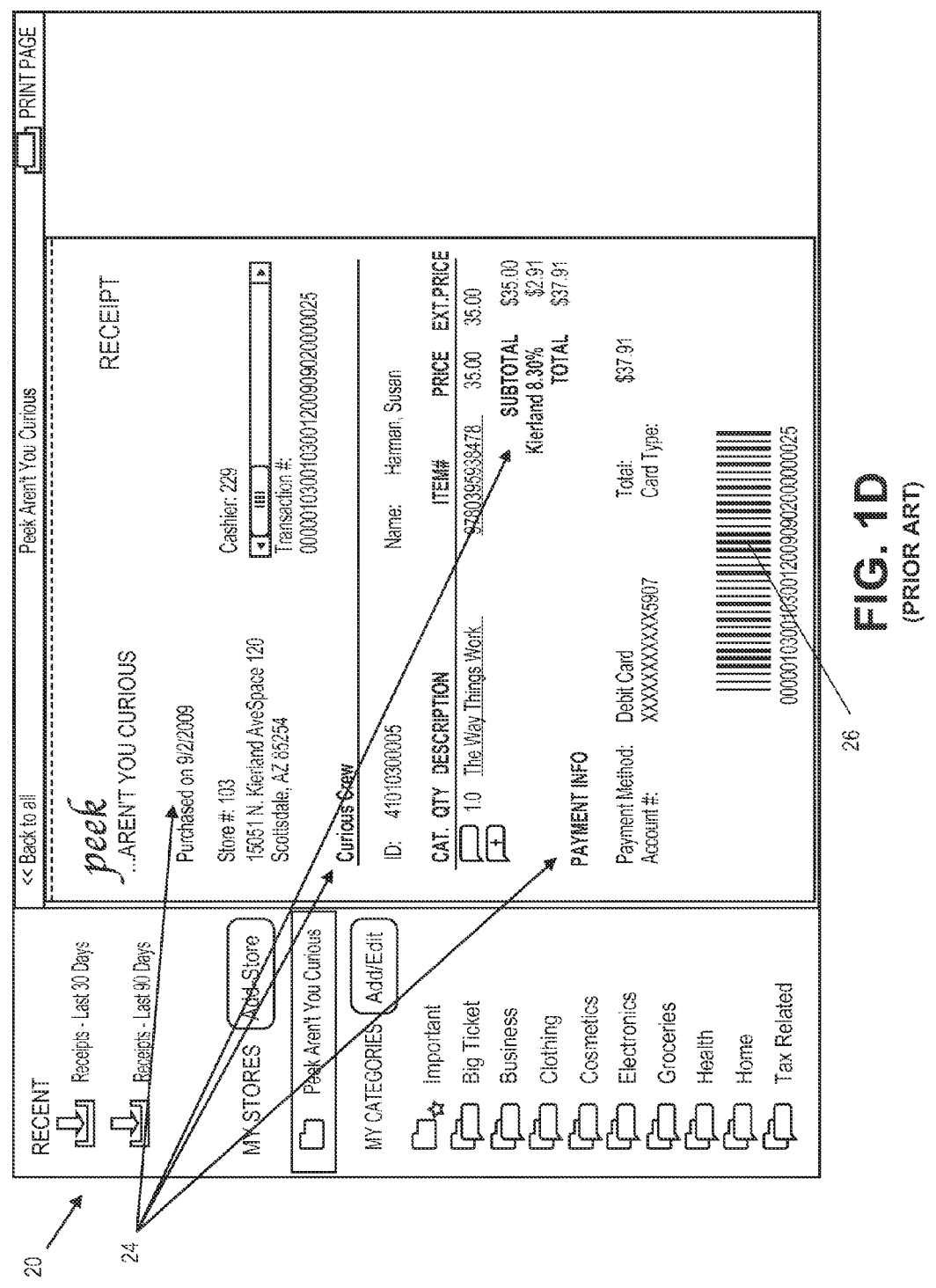
Figure 16:
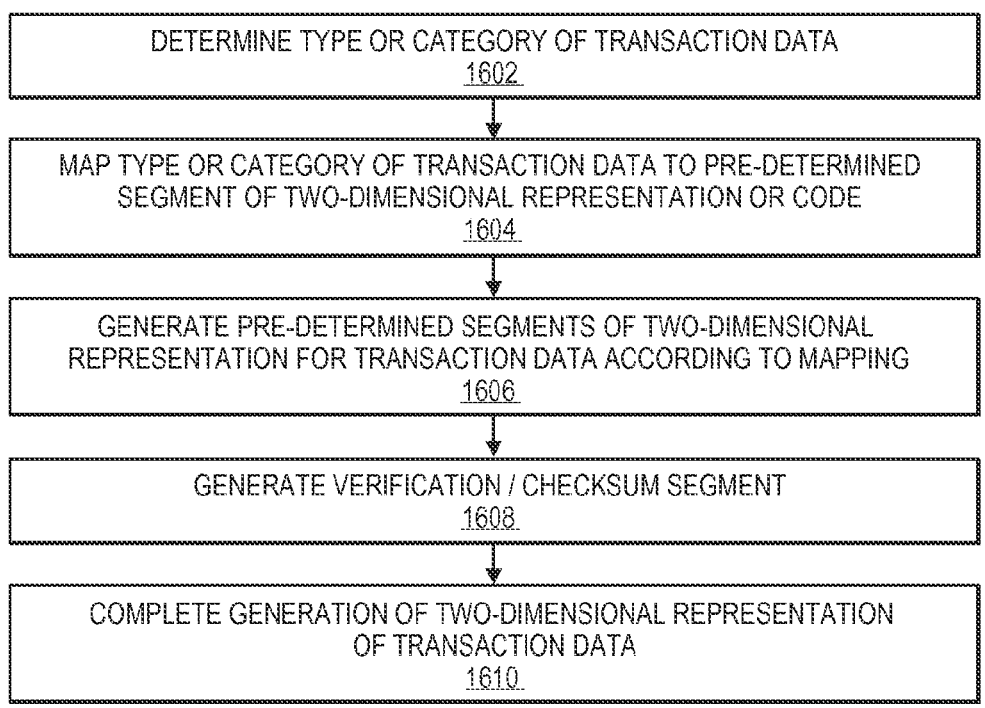
FIG. 16 is a flow diagram of one embodiment of a method for encoding transaction or receipt data and generating an electronic receipt including a two-dimensional machine readable representation of the transaction data.

Referring to FIG. 16, encoding transaction data 1410 into QR CODE 1455 involves encoding program 1437 determining or identifying a type of category of transaction data 1410 to be encoded at 1602. Types or categories utilized may be the same types or categories of transaction data utilized by known financial management systems such as QUICK RECEIPTS, QUICKEN and MINT and include, for example, item identification (e.g., by serial or model number), price data, purchase date, etc. as shown in FIG. 1D.

Figure 17B:
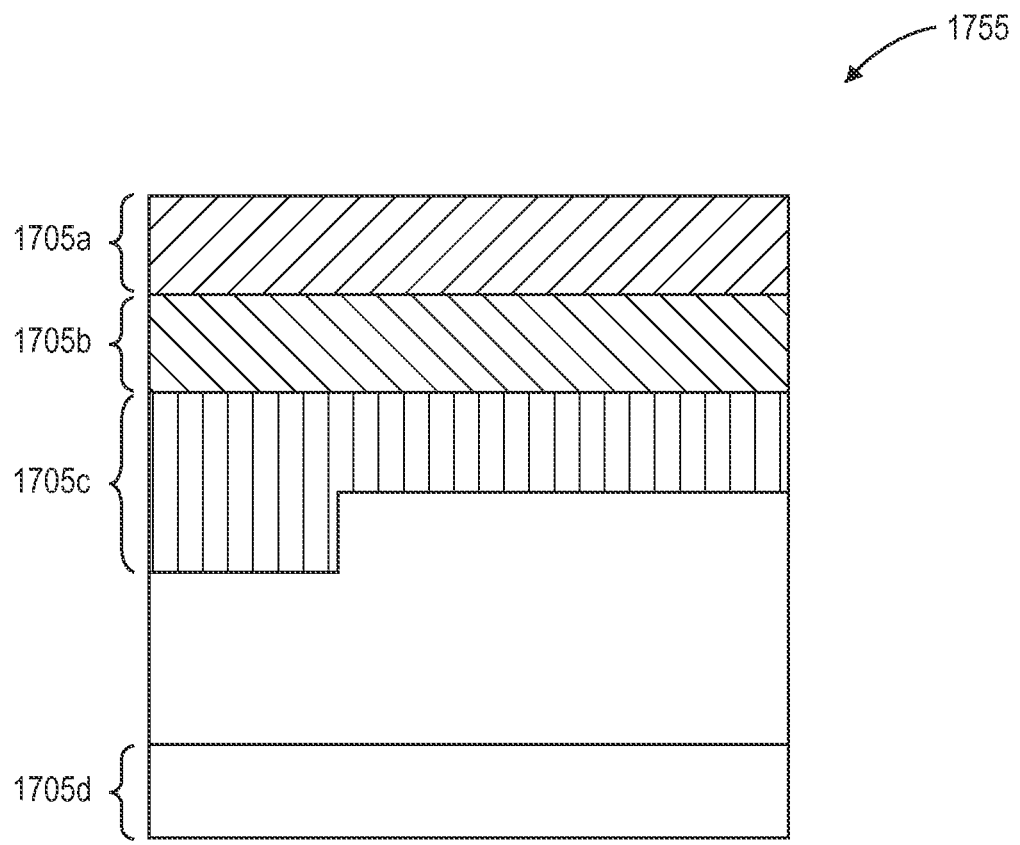
FIG. 17A illustrates a table utilized by embodiments to determine which segment of a two-dimensional machine readable representation should be utilized to encode a particular type or category of transaction data, and FIG. 17B generally illustrates how segments or groups of data elements of a two-dimensional machine readable representation are utilized for encoding transaction data using the table shown in FIG. 17A.

With continuing reference to FIG. 16, and with further reference to FIGS. 17A-B, at 1604, encoding program 1437 maps the type or category of transaction data 1410 to a pre-determined segment 1705 of QR CODE 1455/1755 using table 1700 with columns 1702*a-b* for data category or type and corresponding QR CODE segment 1705, or another suitable mapping mechanism. At 1606, encoding program 1437 generates pre-determined segments 1705 according to mapping table 1700 as representing transaction data 1410 as generally illustrated in FIG. 18.

For example, a first type of transaction data 1410*a* is encoded as or transformed into a first pre-determined segment 1705*a* of QR CODE 1455, a second type of transaction data 1410*b* is encoded as or transformed into a second pre-determined segment 1705*b* of QR CODE 1455, and so on for other segments 1705*c* and other types of transaction data 1410. Referring again to FIG. 16, at 1608, a certain segment 1705*d* of QR CODE 1455 can be a verification segment that confirms encoded data is correct. For example, one or more checksum or hash sums may be generated for one or multiple pre-determined segments 1705*d* of QR CODE 1455 to verify encoded data. At 1610, encoding program 1437 completes generation of the QR CODE 1455 that is encoded with or represents transaction data 1410.

Figure 18:
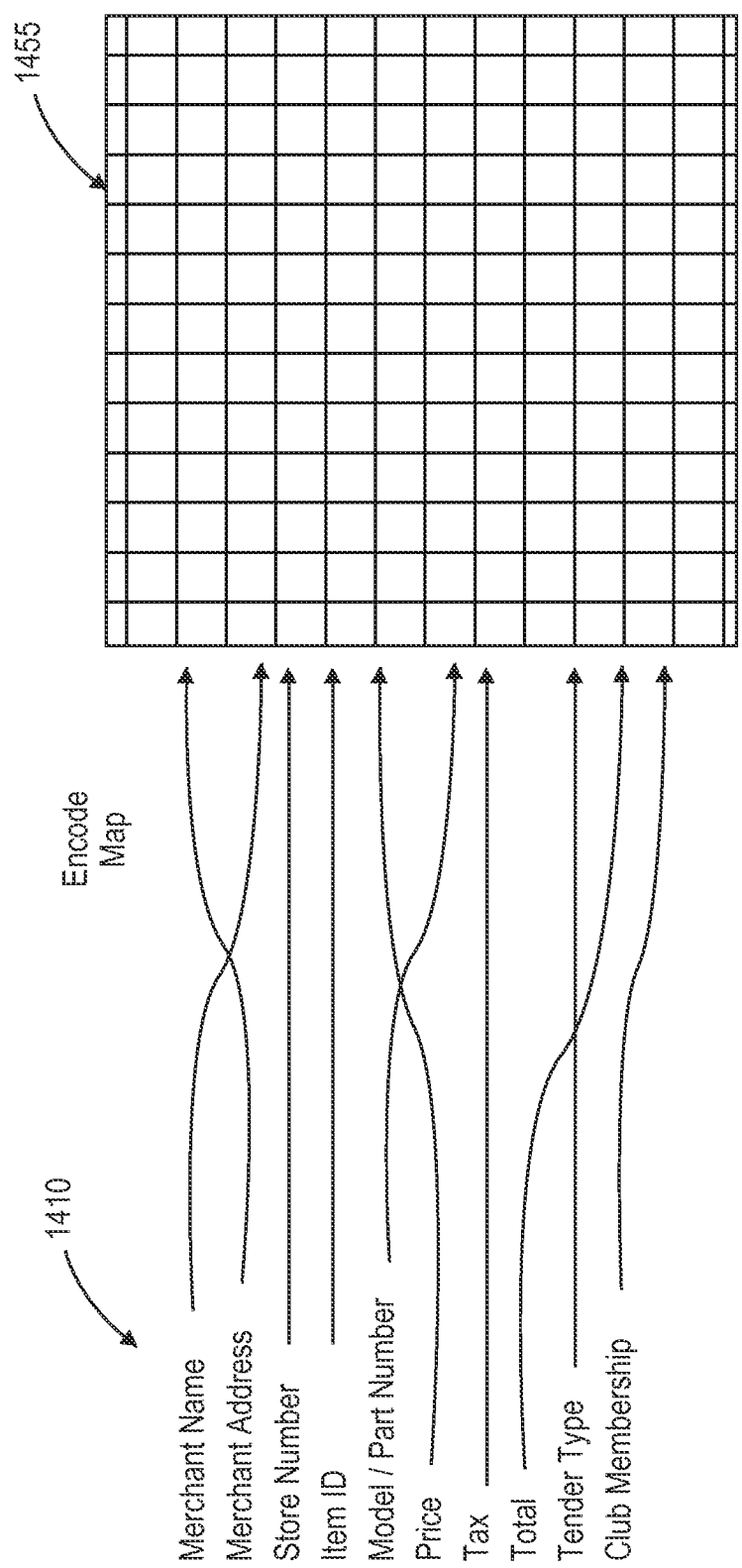
FIG. 18 illustrates how respective transaction data is encoded as or transformed into respective segments of a two-dimensional machine readable representation based at least in part upon mapping and segmentation shown in FIGS. 17A-B.

It will be understood that FIGS. 17A-B and 18 are not intended to illustrate the exact segments 1705 that are encoded, and that a QR CODE 1455 may include a partial or complete row or multiple rows of data elements representing a certain type of transaction data 1410, and as discussed above, further details regarding how two-dimensional matrix codes such as QR CODEs 1455 are structured are not discussed in further detail since they are known to persons of ordinary skill in the art.

Figure 19:
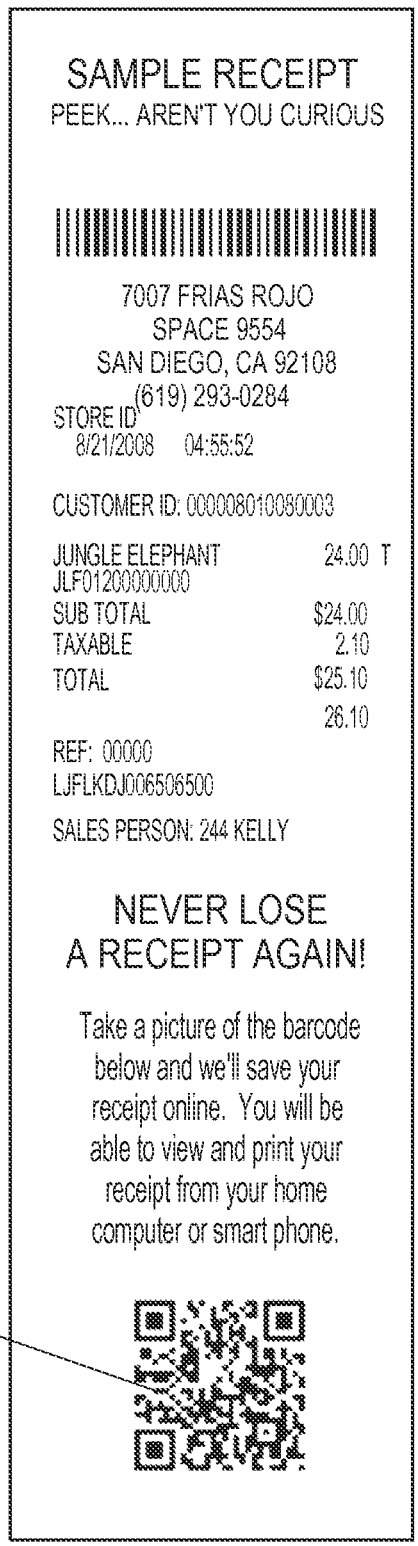
FIG. 19 illustrates one embodiment of a receipt including transaction data and a two-dimensional machine readable representation of the same transaction data.

Referring again to FIG. 15 and with further reference to FIG. 19, at 1508, a receipt document 1450/1750 including the generated QR CODE 1455/1755 is printed and/or transmitted and provided to consumer 1420. As shown in FIG. 19, according to one embodiment, the result of encoding program 1437 is generation of a receipt 1450 that includes transaction data 1410 (e.g., item identification, merchant identification, price, tax, etc.) and, in addition, QR CODE 1455 representing transaction data 1410. Thus, in the illustrated embodiment, receipt 1450 includes transaction data 1410 in one form (alpha-numeric) and the same transaction data 1410 in a different, transformed form of QR CODE 1455. Thus, embodiments generate a hybrid form of a receipt, and utilize QR CODE 1455 to encode the same transaction data 1410 as opposed to other known methods that utilize a QR CODE 1455 as a link to a website or other unrelated data such as a merchant 1430 website.

According to another embodiment, receipt 1450 generated by merchant 1430 with encoding method embodiments includes data such as an identification of the consumer 1420, but no numerical transaction data, which is instead encoded as or transformed into QR CODE 1455. Thus, a receipt 1450 generated according to embodiments may include both item-level transaction data 1410 and a transformed version of that data in the form of QR CODE 1455 or only the resulting QR CODE 1455.

Referring again to FIGS. 14-15, and with further reference to FIGS. 20A-E and 21, at 1510, consumer 1420 acquires an image 1462 of QR CODE 1455 (indicated as "scan" in FIG. 20A) using a camera or other image capture device of the mobile communication device 1460/2000. In the illustrated embodiment, a camera of a mobile communication device 2000 such as a Smartphone is utilized. Other embodiments may involve other image capture devices such as a camera, scanner, and webcam as discussed with reference to FIGS. 9A-C. For ease of explanation, reference is made to a mobile communication device 2000. Image 1462 may be acquired at various locations and times, e.g., while the consumer is still at the merchant, at home, while traveling, etc.

According to one embodiment, acquiring image 1462 results in launching of decoding program 1467, which may be a part of receipt management program that executes locally on mobile communication device, and consumer is prompted to log into an account managed by a computer of a host that manages electronic receipt summaries of a plurality of consumers. According to another embodiment, consumer launches or accesses decoding application and/or receipt management program in order to log into an account.

Figure 21:
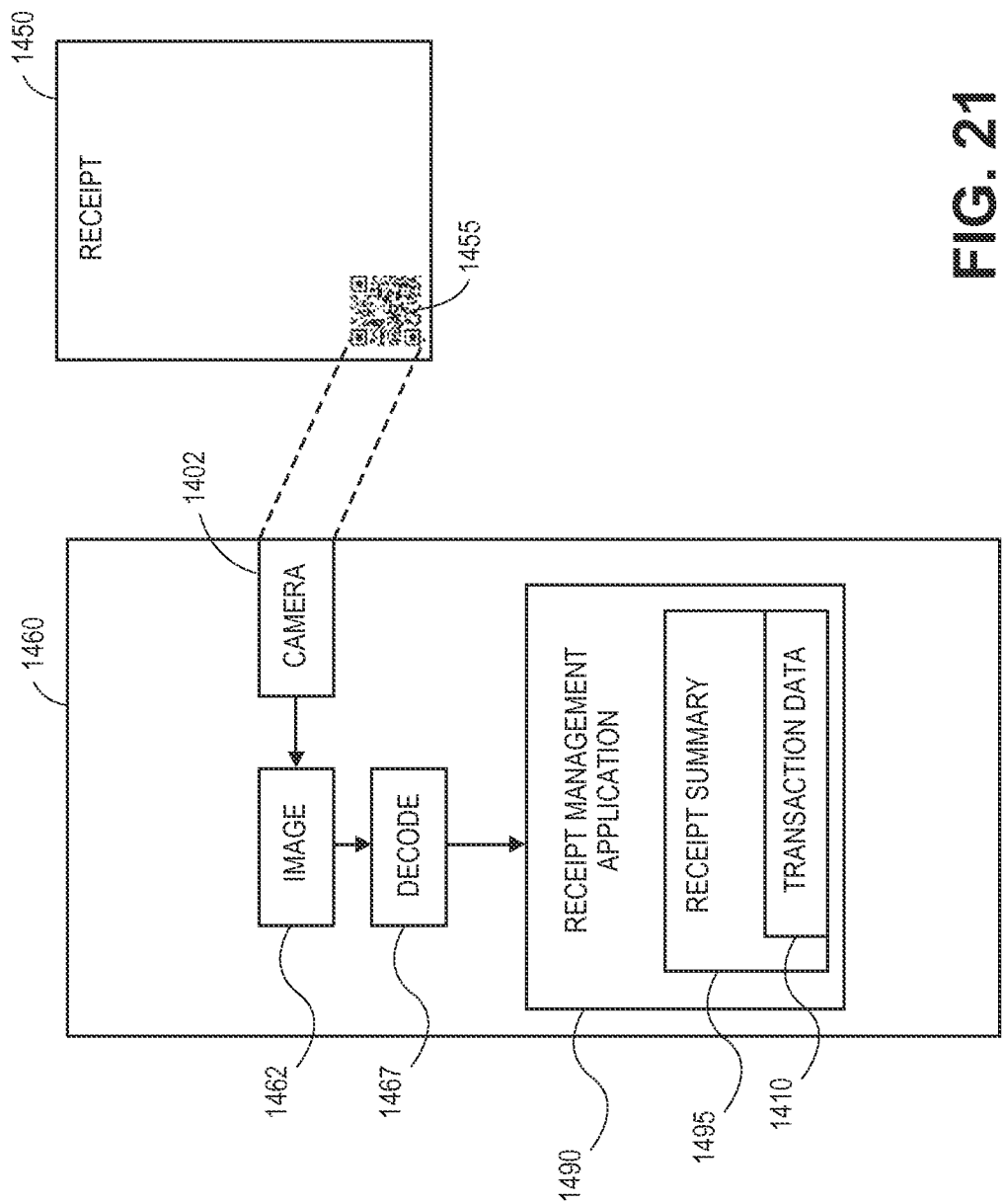
FIG. 21 further illustrates components of a mobile communication device configured according to embodiments for use in acquiring an image of a two-dimensional machine readable representation, decoding the representation, and preparing at least a portion of an electronic receipt summary utilizing decoded data.
Figure 22:
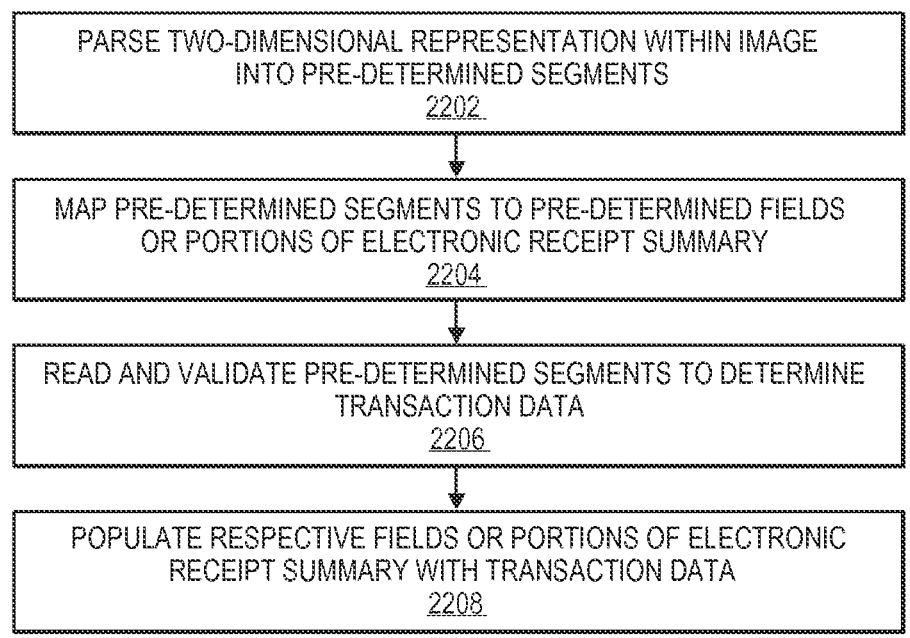
FIG. 22 is a flow chart of one embodiment of a method for decoding a two-dimensional machine readable representation to determine corresponding transaction data to be included in an electronic receipt summary.

For example, FIG. 21 illustrates an embodiment in which a decoding program and a receipt management program execute on mobile communication device locally. In other embodiments, a user may execute a browser to access a website of a host computer (not illustrated in FIG. 21, but described in further detail in U.S. application Ser. No. 12/609,922, the contents of which were previously incorporated herein by reference, hosting receipt management program and log into an account. Thus, it will be understood that aspects of methods and system components may reside on or be executed with mobile communication device, on a computer hosting receipt management program, and both the mobile communication device and host computer such that embodiments that are illustrated are provided to show how system components function.

Figure 23A:
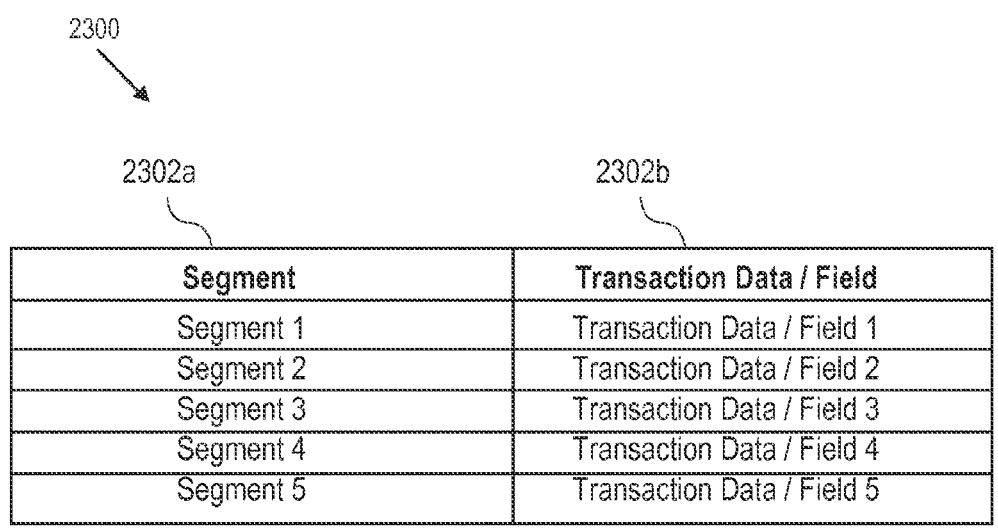
FIG. 23A illustrates a table utilized by embodiments to decode a two-dimension machine readable representation to determine transaction data.
Figure 23B:
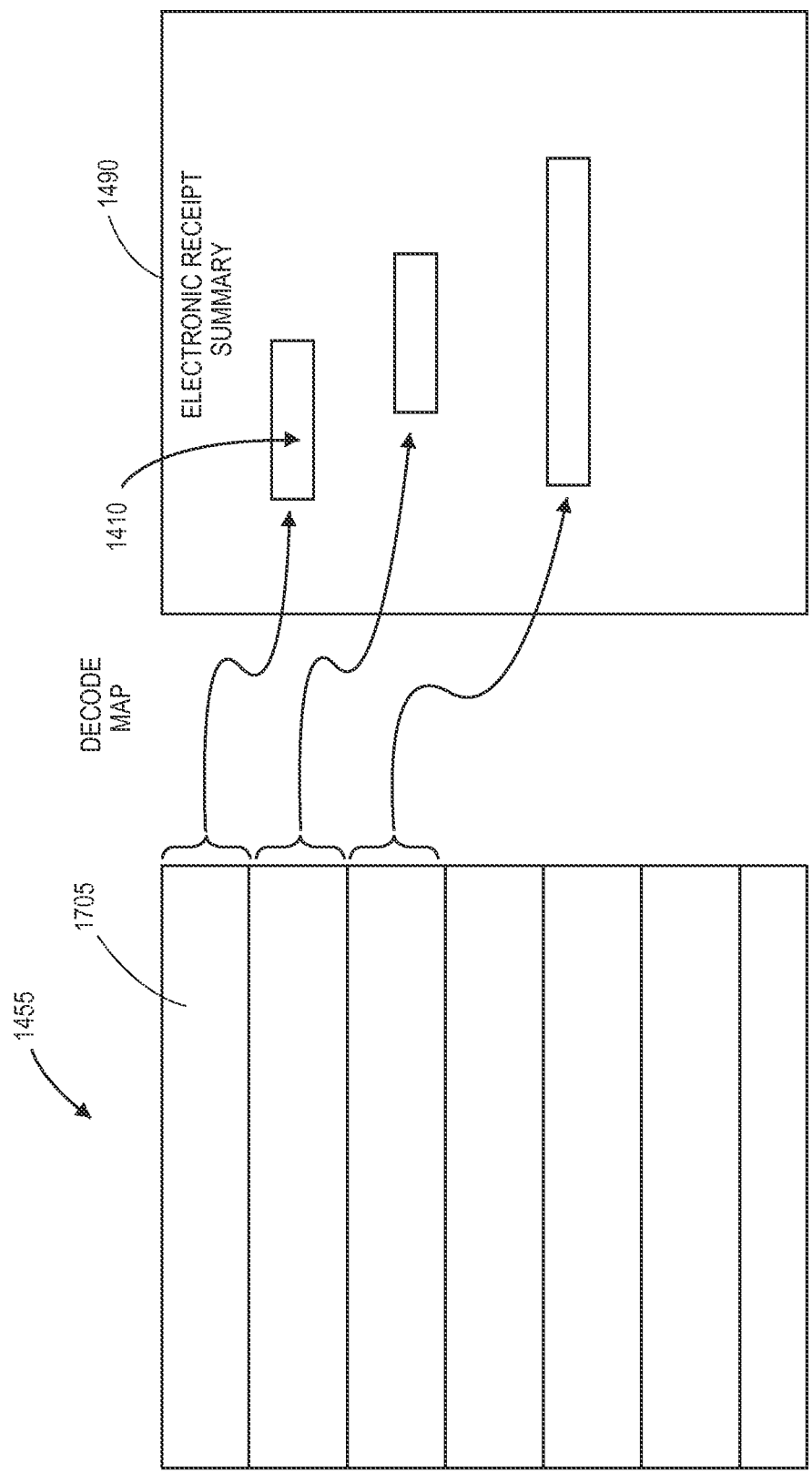
FIG. 23B illustrates how respective fields of an electronic receipt summary generated by a financial management system are populated with data decoded from the two-dimensional machine readable representation.

In the embodiment illustrated in FIG. 21, image 1462 acquired using camera 1402 of mobile communication device 2000 is provided as an input to a decoding program 1467, and at 1512, QR CODE 1455 is decoded to determine transaction data 1410 corresponding to pre-determined segments 1705 of QR CODE 1455. For this purpose, referring to FIG. 22, at 2202, decoding program 1467 parses QR CODE 1455 of acquired image 1462 into pre-determined segments 1705 (e.g. according to a pre-determined segmentation), and at 2204, maps the pre-determined segments 1705 to pre-determined fields or portions of an electronic receipt summary 1495 as generally illustrated in FIG. 23A. At 2206, decoding program 1467 reads and validates decoded transaction data 1410, e.g., based on a checksum or other verification tool that was encoded when transaction data 1410 was initially encoded. At 2208, decoding program 1467 populates respective fields or portions of electronic receipt summary 1495 with respective transaction data 1410 decoded from QR CODE 1455, as generally illustrated in FIG. 23B.

Figure 20:
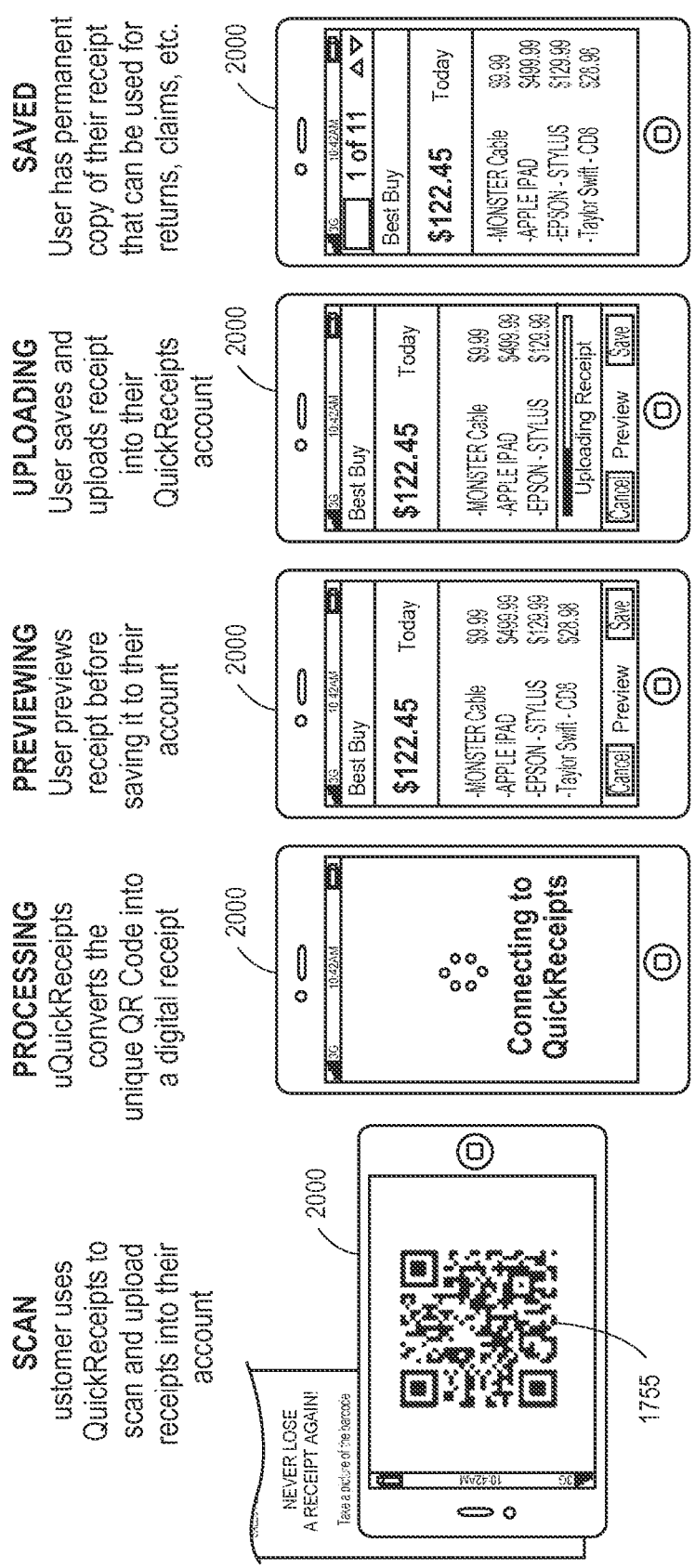
FIGS. 20A-E illustrate one embodiment of decoding a two-dimensional machine readable representation involving use of a mobile communication device to acquire an image of the representation, decode the representation into transaction data, upload decoded data to a computer hosting a financial management system, which populates an electronic receipt summary with decoded data.

Referring again to FIG. 15 and with further reference to FIG. 20, if necessary, before fields of the electronic receipt summary 1495 are populated with decoded transaction data 1410, decoding program 1467 may display decoded transaction data 1410 to consumer 1420 at 1514 (illustrated as "processing" and "previewing" in FIG. 20). Consumer 1420 may then confirm that decoded transaction data 1410 is correct at 1516 (illustrated as "uploading" in FIG. 20). At 1518, electronic receipt summary 1495 is then populated with consumer-verified transaction data 1410 (illustrated as "stored" in FIG. 20).

Certain embodiments may involve a decoding program executing on a mobile communication device and that decodes an image into transaction data, which is integrated into an electronic receipt summary using a local receipt management application executing on mobile communication device. In other embodiments, decoding program executes on a mobile communication device and decodes image into transaction data, which is transmitted over a network to a computer hosting receipt management program, which then integrates decoded transaction data into an electronic receipt summary. In a further embodiment, decoding or other program executes on a mobile communication device and transmits the acquired image from mobile communication device through a network to a computer hosting receipt management program, which then decodes the image (using a separate decoding program as necessary) and integrates decoded transaction data into an electronic receipt summary. Accordingly, it will be understood that different system components may decode QR CODE into transaction data, and different system components may integrated transaction data into an electronic receipt summary.

For example, according to one embodiment, decoding program 1467 executes on mobile communication device 2000 and decodes QR CODE 1455 into transaction data 1410, which is then transmitted over a network to a computer hosting receipt management program configured to received decoded data and integrate decoded data into an electronic receipt summary. Receipt management program may identify consumer and consumer's electronic receipt summary if the consumer already logged into an account and/or using, for example, cellular telephone number, electronic mail address or other consumer identification. Consumer may then access electronic receipt summary by accessing host computer via mobile communication device or another computer.

According to another embodiment, decoding program 1467 executes on mobile communication device 2000, and image of QR CODE 1455 acquired using camera of mobile communication device is transmitted over a network to a computer hosting receipt management program configured to received decoded data and integrate decoded data into an electronic receipt summary. Consumer may then access electronic receipt summary by accessing host computer via mobile communication device or another computer.

Figure 24:
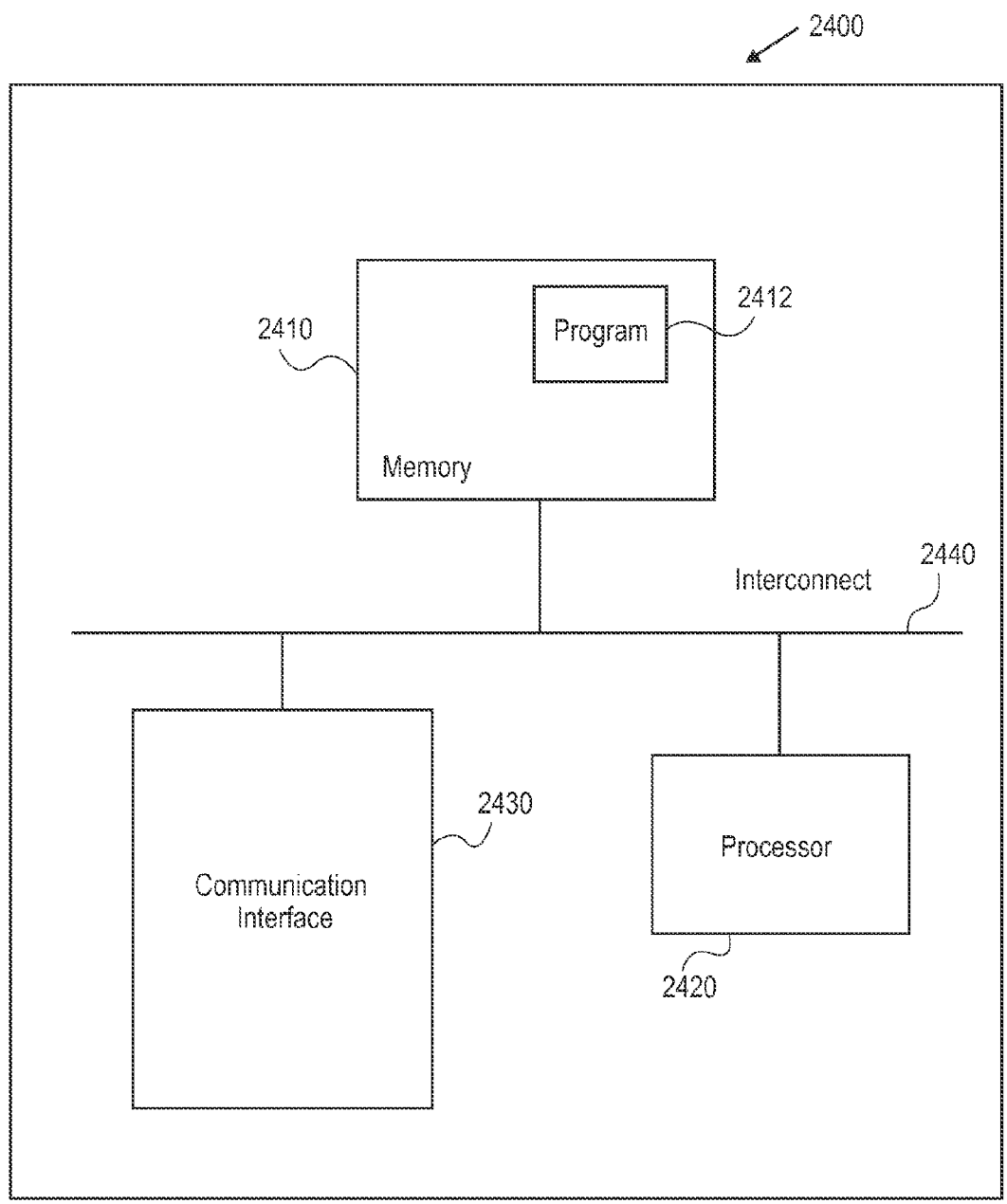
FIG. 24 is a block diagram of components of a computing apparatus or system in which various embodiments may be implemented or that may be utilized to execute embodiments.

FIG. 24 generally illustrates components of a computing device 2400 that may be utilized to execute embodiments and that includes a memory 2410, program instructions 2412, a processor or controller 2420 to execute program instructions 2412, a network or communications interface 2430, e.g., for communications with a network or interconnect 2440 between system components. The memory 2410 may be or include one or more of cache, RAM, ROM, SRAM, DRAM, RDRAM, EEPROM and other types of volatile or non-volatile memory capable of storing data. The processor unit 2420 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2440 may include a system bus, LDT, PCI, ISA, or other types of buses, and the communications or network interface may, for example, be an Ethernet interface, a Frame Relay interface, or other interface. The network interface 2430 may be configured to enable a system component to communicate with other system components across a network which may be a wireless or various other networks. It should be noted that one or more components of computing device 2400 may be located remotely and accessed via a network. Accordingly, the system configuration provided in FIG. 24 is provided to generally illustrate how embodiments may be configured and implemented.

Method embodiments may also be embodied in, or readable from, a computer readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2420 executes program instructions 2412 within memory 2410 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with respect to decoding on a mobile communication device and preparing a tax return, electronic receipt summary or other electronic document using the same mobile communication device, embodiments may also involve transmitting the image of the QR CODE and/or decoded data to another device or computer, which then performs decoding as necessary and integrates decoded data into an electronic document such as a tax return, receipt summary or other electronic document.

Further, while certain embodiments are described with reference to examples of tax forms utilized by the Internal Revenue Service (IRS) of the United States, embodiments may be utilized to prepare electronic tax returns of other levels of a governing body or tax authority such as state tax returns, and tax documents and tax returns of other countries.

Moreover, while embodiments are described with reference to encoding and decoding tax and transaction data, embodiments may also involve encoding of other types of data and generation of other types of documents, e.g., encoding medical or legal records into a QR CODE.

Additionally, while certain embodiments are described with reference to an electronic tax return, receipt summary or other electronic document of a person or individual, embodiments may also apply to corporate entities such as corporations, partnerships, etc.

Further, embodiments may involve a user taking a photograph of a two-dimensional code such as a QR CODE and sending the image via e-mail or SMS to a server. For example, when an image is sent to a QUICKRECEIPTS server, the server, after receiving the image, can ping the user via e-mail or SMS to inform the user that the receipt is ready for viewing using their computer or Smartphone.

Moreover, where certain system diagrams separately illustrate system components, it will be understood that such system components may reside and execute on the same device, e.g., on a mobile communication device, which may be used to decode data and prepare an electronic document, decode data and send decoded data to another device or computer that integrates decoded data into an electronic document, or acquire an image of a code and transmit the image to another device or computer that decodes the image and integrates decoded data into an electronic document.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer implemented method for generating a receipt for an item purchased by a consumer from a merchant, the method comprising:
   determining a first category of first transaction data and a second category of second transaction data to be encoded, wherein the first and second transaction data was generated for purchase of an item by the consumer from a merchant, the first and second categories being categories of a financial management system accessible and utilized by a plurality of consumers to manage their respective digital receipts including the consumer that purchased the item from the merchant;
   mapping the first category to a first pre-determined segment of a Quick Response (QR) code and mapping the second category to a second pre-determined segment of the QR code;
   encoding the first transaction data within the first pre-determined segment and encoding the second transaction data within the second pre-determined segment; and
   generating an electronic receipt comprising the QR code, wherein respective first and second pre-determined segments are encoded with respective first and second transaction data.

2. The method of claim 1, further comprising printing the electronic receipt, the printed receipt being provided to the consumer for the purchase of the item.

3. The method of claim 2, wherein no numerical transaction data is printed on the printed receipt.

4. The method of claim 1, further comprising encoding verification data within a third pre-determined segment, the verification data confirming the first and second transaction data when the first and second transaction data are decoded.

5. The method of claim 4, wherein the verification data is a checksum.

6. A computer-implemented method for populating an electronic receipt summary, the method comprising:
- a computing apparatus receiving an image of a machine readable representation of transaction data of a receipt that was generated for an item purchased by a consumer from a merchant;
- the computing apparatus parsing the image into pre-determined segments;
- the computing apparatus mapping pre-determined segments to fields of the electronic receipt summary;
- the computing apparatus decoding the parsed pre-determined segments to determine respective transaction data; and
- the computing apparatus populating respective fields of the electronic receipt summary with respective transaction data.

7. The method of claim 6, at least one type of transaction data comprising item-level transaction data.

8. The method of claim 6, the image comprising an image of the machine readable representation on a printed receipt.

9. The method of claim 6, wherein the machine readable representation does not identify a link to a website of the merchant.

10. The method of claim 6, wherein the printed receipt does not include any numerical transaction data.

11. The method of claim 6, the machine readable representation comprising a Quick Response (QR) code, wherein decoding the machine readable representation comprises decoding a first pre-determined segment of the QR code to determine a first type of transaction data and decoding a second pre-determined segment of the QR code to determine a second type of transaction data, and decoding a third pre-determined segment of the QR code to determine verification data, the method further comprising confirming the first and second types of transaction data based at least in part upon the verification data, respective fields of the electronic receipt summary being populated with respective confirmed first and second transaction data.

12. The method of claim 6 being performed by a computing apparatus of a mobile communication device of the consumer utilized to acquire the image.

13. The method of claim 12, further comprising transmitting the decoded transaction data from the mobile communication device to a computer hosting a financial management system accessible and utilized by a plurality of consumers to manage their respective digital receipts including the consumer that purchased the item from the merchant.

14. The method of claim 6 being performed by a computing apparatus hosting a financial management system accessible and utilized by a plurality of consumers to manage their respective digital receipts, the plurality of consumers including the consumer that purchased the item from the merchant, the computing apparatus receiving the image from a mobile communication device of the consumer utilized to acquire the image.

15. A printed receipt generated by a transaction processing device of a merchant, the printed receipt consisting of:
- data identifying a consumer that purchased an item from the merchant; and
- a machine readable representation of transaction data for the purchased item purchased by the consumer, wherein no numerical transaction data is printed on the receipt, the machine readable representation being a Quick Response (QR) code, wherein a first pre-determined segment of the QR code is encoded with a first type of transaction data and a second pre-determined segment of the QR code is encoded with a second type of transaction data, wherein a third pre-determined segment of the QR code is encoded with verification data such that when the third pre-determined segment is decoded, the verification data confirms the first and second types of transaction data.

16. The printed receipt of claim 15, wherein the verification data is a checksum.

17. The printed receipt of claim 15, the transaction data comprising item-level transaction data.

18. The printed receipt of claim 15, the data identifying the consumer being selected from the group consisting of a name, a membership number and a credit card number of the consumer.

19. The printed receipt of claim 15, the machine readable representation being readable utilizing a software program executing on a mobile communication device.

20. The printed receipt of claim 15, wherein the machine readable representation does not identify a link to a website of the merchant.

21. A printed receipt generated by a transaction processing device of a merchant for a consumer, the printed receipt comprising:
- data identifying the consumer that purchased an item from the merchant; and
- a machine readable representation of transaction data for the purchased item purchased by the consumer, wherein no numerical transaction data is printed on the receipt, the machine readable representation being a Quick Response (QR) code, wherein a first pre-determined segment of the QR code is encoded with a first type of transaction data, a second pre-determined segment of the QR code is encoded with a second type of transaction data, and a third pre-determined segment of the QR code is encoded with verification data such that when the third pre-determined segment is decoded, the verification data confirms the first and second types of transaction data.

22. The printed receipt of claim 21, wherein the verification data is a checksum.

23. The printed receipt of claim 21, the transaction data comprising item-level transaction data.

24. The printed receipt of claim 21, the data identifying the consumer being selected from the group consisting of a name, a membership number and a credit card number of the consumer.

* * * * *